(12) United States Patent
Yu et al.

(10) Patent No.: US 11,937,080 B2
(45) Date of Patent: Mar. 19, 2024

(54) METHOD FOR UPDATING NETWORK ACCESS APPLICATION AUTHENTICATION INFORMATION, TERMINAL, AND SERVER

(71) Applicant: Huawei Technologies Co., Ltd., Shenzhen (CN)

(72) Inventors: Xiaobo Yu, Shenzhen (CN); Shuiping Long, Beijing (CN); Linyi Gao, Berkshire (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 16/634,349

(22) PCT Filed: Jul. 28, 2017

(86) PCT No.: PCT/CN2017/095033
§ 371 (c)(1),
(2) Date: Jan. 27, 2020

(87) PCT Pub. No.: WO2019/019185
PCT Pub. Date: Jan. 31, 2019

(65) Prior Publication Data
US 2020/0236546 A1  Jul. 23, 2020

(51) Int. Cl.
*H04W 12/06* (2021.01)
*G06F 8/65* (2018.01)
(Continued)

(52) U.S. Cl.
CPC ............. *H04W 12/06* (2013.01); *G06F 8/65* (2013.01); *H04L 63/102* (2013.01); *H04W 8/22* (2013.01); *H04W 48/16* (2013.01); *H04W 76/19* (2018.02)

(58) Field of Classification Search
CPC ....... H04W 12/06; H04W 76/19; H04W 8/22; H04W 48/16; G06F 8/65; H04L 63/102
See application file for complete search history.

(56) References Cited

U.S. PATENT DOCUMENTS 8,514,852 B2    8/2013   Dacosta et al.
9,553,857 B2 *  1/2017   Nakano ................... G06F 21/10
(Continued)

FOREIGN PATENT DOCUMENTS

CN    101378582 A    3/2009
CN    102355658 A    2/2012
(Continued)

OTHER PUBLICATIONS

CSMG (Reprogrammable SIMs: Technology, Evolution and Implications, Sep. 25, 2012, 95 pages) (Year: 2012).*
(Continued)

*Primary Examiner* — Oleg Korsak
(74) *Attorney, Agent, or Firm* — Conley Rose, P.C.

(57) ABSTRACT

A method for updating network access application authentication information applicable to a terminal having an embedded universal integrated circuit card (eUICC) that has at least one profile. The method includes receiving, by the terminal, a first message from a remote server, where the first message includes network access application (NAA) authentication parameter update information and a first identifier, updating, by the terminal, authentication information of a profile corresponding to the first identifier based on the NAA authentication parameter update information, and detaching, by the terminal, from a network and re-attaching to the network based on updated authentication information of the profile.

20 Claims, 24 Drawing Sheets

(51) Int. Cl.
*H04L 9/40* (2022.01)
*H04W 8/22* (2009.01)
*H04W 48/16* (2009.01)
*H04W 76/19* (2018.01)

(56) References Cited

U.S. PATENT DOCUMENTS

| | | | |
|---|---|---|---|
| 2005/0108546 A1* | 5/2005 | Lehew | H04L 63/06 713/182 |
| 2011/0269423 A1* | 11/2011 | Schell | H04L 63/0853 455/411 |
| 2012/0324541 A1* | 12/2012 | Palacios Valverde | H04L 12/2834 726/4 |
| 2013/0283257 A1* | 10/2013 | Sen | G06F 8/656 717/173 |
| 2015/0143125 A1* | 5/2015 | Nix | H04W 12/40 713/171 |
| 2015/0163056 A1* | 6/2015 | Nix | H04L 63/0435 380/46 |
| 2016/0165433 A1* | 6/2016 | Larignon | H04W 8/205 455/419 |
| 2016/0227409 A1* | 8/2016 | Schell | H04L 63/20 |
| 2016/0246585 A1* | 8/2016 | Li | H04L 63/0853 |
| 2016/0294869 A1* | 10/2016 | Labana | H04L 63/08 |
| 2017/0215063 A1* | 7/2017 | Wozniac | H04W 8/183 |
| 2017/0338962 A1* | 11/2017 | Li | H04W 36/0055 |
| 2019/0097794 A1* | 3/2019 | Nix | H04L 9/0844 |
| 2020/0084622 A1* | 3/2020 | Yoon | H04L 9/3268 |
| 2020/0128390 A1* | 4/2020 | Lee | H04L 63/0823 |
| 2020/0137572 A1* | 4/2020 | Lee | H04L 9/32 |
| 2020/0264857 A1* | 8/2020 | Koo | G06Q 20/16 |
| 2020/0272446 A1* | 8/2020 | Koo | H04W 8/22 |
| 2020/0314639 A1* | 10/2020 | Yu | H04W 12/37 |
| 2020/0351651 A1* | 11/2020 | Koo | H04W 12/03 |
| 2020/0359219 A1* | 11/2020 | Yoon | H04L 9/0844 |
| 2021/0235245 A1* | 7/2021 | Fan | G06F 9/44505 |
| 2021/0274348 A1* | 9/2021 | Yoon | H04W 12/30 |
| 2021/0289344 A1* | 9/2021 | Fan | H04W 8/205 |
| 2021/0314772 A1* | 10/2021 | Koo | H04W 12/08 |

FOREIGN PATENT DOCUMENTS

| | | |
|---|---|---|
| CN | 104469737 A | 3/2015 |
| CN | 105101319 A | 11/2015 |
| CN | 105682075 A | 6/2016 |
| CN | 105704702 A | 6/2016 |
| CN | 106899540 A | 6/2017 |
| WO | 2017030776 A1 | 2/2017 |
| WO | 2017082697 A1 | 5/2017 |

OTHER PUBLICATIONS

SA3, "New WID on Study on Long Term Key Update Procedures," SP-170413, 3GPP TSG SA Meeting #76, Jun. 7-9, 2017, West Palm Beach, Florida, USA, 3 pages.

GSM Association "RSP Architecture Version 1.0," Dec. 23, 2015, 52 pages.

* cited by examiner

| InitialiseSecure Channel | Profile content update request information | Encrypted data (NAA authentication parameter update information) | ... |
|---|---|---|---|

FIG. 19

| InitialiseSecure Channel | Profile content update request information | Protection key | Encrypted data (NAA authentication parameter update information) | ... |
|---|---|---|---|---|

FIG. 20

| InitialiseSecure Channel | Profile content and firmware update request information | Encrypted data (authentication algorithm identifier and NAA authentication parameter update information) | ... |
|---|---|---|---|

FIG. 21

| InitialiseSecure Channel | Profile content and firmware update request information | Protection key | Encrypted data (authentication algorithm identifier and NAA authentication parameter update information) | ... |
|---|---|---|---|---|

FIG. 22

METHOD FOR UPDATING NETWORK ACCESS APPLICATION AUTHENTICATION INFORMATION, TERMINAL, AND SERVER

CROSS-REFERENCE TO RELATED APPLICATIONS

This application is a U.S. National Stage of International Patent Application No. PCT/CN2017/095033 filed on Jul. 28, 2017, which is hereby incorporated by reference in its entirety.

TECHNICAL FIELD

Embodiments of the present invention relate to the eUICC management field, and in particular, to a method for updating network access application authentication information, a terminal, and a server.

BACKGROUND

An embedded universal integrated circuit card (embedded universal integrated circuit card, eUICC) is a third-generation telecommunications smart card, and can securely execute remote profile management or local profile management (for example, profile enabling, disabling, or deletion triggered by a terminal device user). "eUICC" comes from embedded (embedded) UICC. An eUICC may be embedded in a terminal device in a form of a single chip, or serves as a part of another single chip in the terminal device. However, it does mean that the eUICC is necessarily irremovably embedded in the terminal device. Instead, the eUICC may be in a form of a removable card, just like a subscriber identity module (subscriber identification module, SIM) card, a micro SIM card, or a nano SIM card.

In actual application, after downloading and installing a profile (profile) provided by a mobile network operator, an eUICC may enable the profile and further access the operator's network (for example, a 2G/3G/4G network).

The profile (profile) is a collection of operator data and applications, and generally includes network access application parameters, such as a user key Ki, an international mobile subscriber identity (international mobile subscriber identity, IMSI), a mobile network operator-security domain (mobile network operator-Security domain, MNO-SD), a supplementary security domain (supplementary security domains, SSD), a controlling authority security domain (controlling authority security domain, CASD), an application (for example, an NFC application), a Java card program, another element in a file system, and profile metadata. The profile metadata includes profile policy rules (profile policy rules). A correspondence between an IMSI and a Ki is used to identify an identity of a user that requests network authentication.

When the eUICC uses the profile to access the operator's network, network access application (network access application, NAA) authentication is required. The NAA authentication is a process used to verify identities of a network entity and the eUICC. The network access application (network access application, NAA) authentication process needs an authentication algorithm program and authentication parameters (for example, the Ki and the IMSI). For example, the authentication algorithm program may be a segment of code that implements an authentication algorithm or data that describes the authentication algorithm. The authentication algorithm program may be used to generate a signed response (SRES) based on the authentication parameters, and derive a cipher key (cipher key, CK) and an integrity key (integrity key, IK), so that the network entity and the eUICC use these keys to verify the identities of each other. The profile may also be referred to as a subscription information set.

However, it is found from practice that, when the eUICC already has a profile of an operator and the operator imposes a requirement for upgrading an authentication algorithm program, how to configure the authentication algorithm program in the eUICC so that an upgraded authentication algorithm program and an upgraded profile can match each other becomes a technical problem urgently to be resolved by a person skilled in the art. In addition, there may be a problem of leaking information such as the user key Ki and the IMSI. How to provide security protection after the authentication information leakage is also an important problem to be resolved.

SUMMARY

Embodiments of the present invention provide a method for updating network access application authentication information, a terminal, and a server, to improve NAA authentication security.

According to a first aspect, a method for updating network access application authentication information is provided. The method is applicable to a terminal. The terminal has an eUICC, and the eUICC has at least one profile. The method includes: receiving, by the terminal, a first message from a remote server, where the first message includes network access application NAA authentication parameter update information and a first identifier, updating, by the terminal, authentication information of a profile corresponding to the first identifier based on the NAA authentication parameter update information: and detaching, by the terminal, from a network, and re-attaching to the network based on updated authentication information of the profile. In the embodiments of this application, re-attaching to the network may be understood as accessing the network. The remote server may include one or more of a subscription manager-data preparation (subscription manager-data preparation, SM-DP+) server, a mobile network operator (mobile network operator, MNO) server, a profile content management platform (profile content management platform, PCMP), or the like. The remote server may generate the first message based on basic information provided by an operator, or the MNO server may generate the first message based on the basic information. The basic information includes the NAA authentication parameter update information and a target identifier. According to the embodiments of this application, NAA authentication information can be updated, and communication security can be improved by periodically or aperiodically updating the NAA authentication information.

In an optional implementation, the target identifier is mainly used to identify a profile of an operator. For example, the first identifier may be an integrated circuit card ID (integrated circuit card ID, ICCID), an issuer security domain profile (issuer security domain profile, ISD-P), or the like. In another optional implementation, the first identifier may be a session identifier (TransactionID). A profile identifier may be an ICCID.

In another optional implementation, the first message further includes profile content update request information, and the profile content update request information is used to instruct the eUICC to update content of the profile corresponding to the first identifier. According to the embodiments of this application, a function of the first message can be determined based on the profile content update request information, to update the authentication information based on information carried in the first message. The profile content update request information may alternatively be information about an issuer security domain profile update request (UpdateISDPRequest). The profile content update request information may include one SM-DP+ object ID object identifier (dpOid Object identifier), and the object identifier is used to indicate an SM-DP+ server that sends the first message. Optionally, the profile content update request information may further include the first identifier. The profile content update request information may be a profile content update indication. Optionally, the profile content update indication may alternatively include the dpOid object identifier and the first identifier. In still another optional implementation, the terminal may further notify an authentication management server, so that the authentication management server updates authentication information of a profile corresponding to the second identifier, and the terminal and the authentication management server can perform bidirectional authentication by using the updated authentication information of the profile. The authentication information may include at least one of an IMSI and a Ki. Optionally, the authentication information may also include an authentication algorithm program. Specifically, the following is included: The remote server includes a first remote server and a second remote server. Before the terminal de-attaches from the network, the method further includes: sending, by the terminal, a second message to the first remote server, where the second message includes a second identifier, the second message is used to instruct the second remote server to update, in the authentication management server, authentication information of a profile corresponding to the second identifier, and the first identifier and the second identifier correspond to a same profile. Alternatively, the terminal sends a third message to the remote server, where the third message includes a third identifier, the third message is used to instruct the remote server to update, in the authentication management server, authentication information of a profile corresponding to the third identifier, and the first identifier and the third identifier correspond to a same profile. The authentication management server may include a home subscriber server (home subscriber server, HSS) or an authentication center (authenticate server, AuC). According to the embodiments of this application, the terminal notifies the authentication management server after updating the authentication information, so that when the terminal accesses the network, the authentication management server knows that the authentication information of the terminal has been updated, and the authentication management server also updates the authentication information after the terminal updates the authentication information. In this way, when the terminal accesses the network, the terminal and a network device can correctly perform bidirectional authentication.

In still another optional implementation, the first message further includes an authentication algorithm program. Before the updating authentication information of a profile corresponding to the first identifier based on the NAA authentication parameter update information, the method further includes: adding, by the terminal, the authentication algorithm program to the eUICC. According to the embodiments of this application, the authentication algorithm program can be updated, so that the eUICC provides more algorithm options, to further improve communication security.

In still another optional implementation, the accessing the network based on updated authentication information includes: accessing the network based on the NAA authentication parameter update information and the authentication algorithm program, where the NAA authentication parameter update information and the authentication algorithm program are mainly used for bidirectional authentication after the network attachment.

In still another optional implementation, the remote server may send the first message to the terminal in a remote management (remote profile management, RPM) command manner, a profile update or upgrade manner, an eUICC system file update manner, a discovery server (discovery service, DS) event manner, or the like. For the remote management command manner, the first message may be carried in a remote management command or may be the remote management command. For the profile update or upgrade manner, the first message may be a profile update package. For the eUICC system file update manner, the first message may be an update system files message. For the DS event manner, the first message may be an NAA authentication information update package obtained based on an event record.

In still another optional implementation, the first message further includes profile content and firmware update request information, and the profile content and firmware update request information is used to instruct the eUICC to update eUICC firmware and content of the profile corresponding to the first identifier. The profile content and firmware update request information may include one SM-DP+ object ID object identifier (dpOid Object identifier), and the object identifier is used to indicate an SM-DP+ server that sends the first message. Optionally, the profile content and firmware update request information may further include the first identifier. The profile content and firmware update request information may be a profile content and firmware update indication. Optionally, the profile content update indication may alternatively include the dpOid object identifier and the first identifier. According to the embodiments of this application, a function of the first message can be determined based on the profile content and firmware update request information, to update the eUICC firmware and the authentication information of the profile based on information carried in the first message. The eUICC firmware may be an eUICC operating system, or an eUICC platform and operating system. The firmware may also be referred to as eUICC platform firmware.

In still another optional implementation, before the terminal receives the first message, the terminal receives first metadata sent by the remote server, where the first metadata includes a profile content update identifier, and the profile content update identifier is used to indicate that the terminal does not need to obtain a user acknowledgment. Specifically, the profile content update identifier is used so that the terminal does not need to obtain a user acknowledgment before receiving a profile update package. The first metadata is metadata corresponding to the profile update package. The first metadata may alternatively be metadata corresponding to a profile content update file generated by the SM-DP+ server. The profile content update file may include the NAA authentication parameter update information. Optionally, the profile content update file may also include the authentication algorithm program.

According to the embodiments of this application, the NAA authentication information can be updated, and communication security can be improved by periodically or aperiodically updating the NAA authentication information.

The terminal notifies the authentication management server after updating the authentication information, so that when the terminal accesses the network, the authentication management server knows that the authentication information of the terminal has been updated, and the authentication management server also updates the authentication information after the terminal updates the authentication information. In this way, when the terminal accesses the network, the terminal and a network device can correctly perform bidirectional authentication. The authentication algorithm program can be updated, so that the eUICC provides more algorithm options, to further improve communication security.

According to a second aspect, a method for updating network access application authentication information is provided. The method is applicable to an eUICC. The eUICC is installed on a terminal, and the eUICC has at least one profile. The method includes: receiving, by the eUICC, a first message from a remote server, where the first message includes network access application NAA authentication parameter update information and a first identifier; updating, by the eUICC, authentication information of a profile corresponding to the first identifier based on the NAA authentication parameter update information; and performing, by the eUICC, bidirectional authentication with a network based on updated authentication information of the profile. According to the embodiments of this application, the eUICC can update the authentication information for bidirectional authentication in a network attachment process, to improve communication security.

In an optional implementation, the first identifier includes an ICCID, an ISD-P identifier, or a session identifier (TransactionID).

In another optional implementation, the eUICC may notify an authentication management server that the NAA authentication information has been updated. Specifically, the remote server includes a first remote server and a second remote server, and before the performing, by the eUICC, bidirectional authentication with a network based on updated authentication information of the profile, the method further includes: sending, by the eUICC, a second message to the first remote server by using an LPA, where the second message includes a second identifier, the second message is used to instruct the second remote server to update, in the authentication management server, authentication information of a profile corresponding to the second identifier, and the first identifier and the second identifier correspond to a same profile. Alternatively, the eUICC sends a third message to the remote server by using an LPA, where the third message includes a third identifier, the third message is used to instruct the remote server to update, in the authentication management server, authentication information of a profile corresponding to the third identifier, the first identifier and the third identifier correspond to a same profile, and the second identifier and the third identifier each include an ICCID. According to the embodiments of this application, the authentication information can be synchronized between the authentication management server and the eUICC, and signaling overheads are low. In this way, the eUICC and the authentication management server can correctly perform bidirectional authentication after the update is completed.

In still another optional implementation, the second message or the third message includes an authentication algorithm identifier, and the second message or the third message is used to instruct the authentication management server to associate the authentication algorithm identifier with a profile identifier. According to the embodiments of this application, the authentication information can be synchronized between the authentication management server and the eUICC, and more convenience is brought to the remote server. In this way, the eUICC and the authentication management server can correctly perform bidirectional authentication after the update is completed.

In yet another optional implementation, the first message further includes an authentication algorithm program. Before the updating, by the eUICC, authentication information of a profile corresponding to the first identifier based on the NAA authentication parameter update information, the method further includes: adding, by the eUICC, the authentication algorithm program. Specifically, the eUICC may add the authentication algorithm program to a telecom framework (telecom framework). The telecom framework is an operating system service in the eUICC, and is mainly used to provide a network authentication algorithm for an NAA in an ISD-P. In addition, the telecom framework may further use a parameter in a profile in an enabled state to configure an algorithm function. According to the embodiments of the present invention, updating the network authentication algorithm makes network communication more secure.

In yet another optional implementation, the profile corresponding to the target identifier may be a profile in the enabled state or a profile in a disabled state. The profile in the enabled state is generally a profile being used in a communication process. When the NAA authentication information of the profile is updated, a baseband processor needs to use the updated authentication information to perform bidirectional authentication with a network side, to attach to the network. Specifically, the method further includes: sending, by the eUICC, a fourth message to the baseband processor when the profile corresponding to the first identifier is in the enabled state, where the fourth message is used to instruct the baseband processor to access the network based on the updated authentication information. According to the embodiments of this application, updating the authentication information of the profile in the enabled state means updating authentication information in a network communication process, and communication security is improved.

In yet another optional implementation, the profile in the enabled state needs to be re-enabled, so that the eUICC uses the updated authentication information to perform bidirectional authentication with the network. After the baseband processor accesses the network based on the updated authentication information, the method further includes: re-enabling, by the eUICC, the profile corresponding to the target identifier; and sending, by the eUICC, a fifth message to the local profile assistant (local profile assistant, LPA), where the fifth message is used to indicate that the profile corresponding to the target identifier is successfully re-enabled, so that the LPA instructs the baseband processor to access the network based on the updated authentication information. According to the embodiments of this application, updating the authentication information of the profile in the enabled state means updating authentication information in a network communication process, and communication security is improved.

In yet another optional implementation, the remote server includes a profile content management platform PCMP. Before the receiving, by a UICC, a first message of a first network access application from a remote server, the method further includes: receiving, by the eUICC, an event record sent by the LPA, where the event record includes a PCMP address, and the event record is used to instruct to obtain the first network access application NAA authentication information from the PCMP; and when the PCMP address included in the event record is the same as a PCMP address included in the profile in the enabled state, sending, by the eUICC, an ICCID and the PCMP address included in the profile in the enabled state to the LPA, so that the LPA obtains, based on the ICCID, the first network access application NAA authentication information from an address indicated by the PCMP address.

In yet another optional implementation, the first message further includes profile content and firmware update request information, and the profile content and firmware update request information is used to indicate that the first message is used to update firmware and content of the profile corresponding to the target identifier. According to the embodiments of this application, a function of the first message can be determined based on a profile content and firmware update identifier, to update the eUICC firmware and the authentication information of the profile based on information carried in the first message. The eUICC firmware may be an eUICC operating system, or an eUICC platform and operating system. The firmware may also be referred to as eUICC platform firmware.

In yet another optional implementation, the first message further includes profile content update request information, and the profile content update request information is used to instruct the eUICC to update content of the profile corresponding to the first identifier.

According to the embodiments of this application, the eUICC can update the authentication information for bidirectional authentication in a network attachment process, to improve communication security. Further, the authentication information can be synchronized between the authentication management server and the eUICC, and signaling overheads are low. In this way, the eUICC and the authentication management server can correctly perform bidirectional authentication after the update is completed. Further, the authentication information can be synchronized between the authentication management server and the eUICC, and more convenience is brought to the remote server. In this way, the eUICC and the authentication management server can correctly perform bidirectional authentication after the update is completed. Moreover, the network authentication algorithm can be updated, so that network communication is more secure. In addition, updating the authentication information of the profile in the enabled state means updating authentication information in a network communication process, and communication security is improved.

According to a third aspect, a method for updating network access application authentication information is provided. The method includes: receiving, by an LPA, a first message from a remote server, where the first message includes network access application NAA authentication parameter update information and a first identifier; establishing, by the LPA, a logical channel with a profile corresponding to the first identifier based on the target identifier; and sending, by the LPA, a second message to the profile corresponding to the target identifier, where the second message includes the NAA authentication parameter update information, so that an eUICC updates authentication information of the profile corresponding to the first identifier based on the NAA authentication parameter update information and performs bidirectional authentication with a network based on updated authentication information. According to the embodiments of this application, the remote server can send to-be-updated authentication information to the eUICC by using the LPA provided by a terminal. In this way, the authentication update information is updated, and network communication security is improved.

In an optional implementation, the first identifier includes an ICCID, a session identifier, or an issuer security domain subscription information set identifier.

In another optional implementation, an authentication management server may further be notified that the authentication information corresponding to the profile has been updated. Specifically, the method further includes: receiving, by the LPA, a third message sent by the eUICC, where the third message includes profile content update completion information; sending, by the LPA, a fourth message to the remote server, where the fourth message includes the profile content update completion information; and sending, by the LPA, a fifth message to a baseband processor, where the fifth message is used to instruct the baseband processor to obtain the updated authentication information of the profile from the eUICC to access the network. The authentication management server may include a home subscriber server (home subscriber server, HSS) or an authentication center (authenticate server, AuC). To update both NAA authentication parameter information corresponding to the profile and an authentication algorithm, the LPA may send, to the authentication management server, a profile identifier and an authentication algorithm identifier that are carried in the fourth message, so that the authentication management server associates an updated profile with updated authentication information. To update an NAA authentication parameter corresponding to the profile, the LPA may send, to the authentication management server, a profile identifier carried in the fourth message, so that the authentication management server changes a NAA authentication parameter corresponding to a profile based on the NAA authentication parameter update information. After generating the NAA authentication parameter update information, the remote server may first send the NAA authentication parameter update information to the authentication management server. The authentication management server may first cache the NAA authentication parameter update information, and after receiving the third message sent by the eUICC, use the NAA authentication parameter update information to replace an old NAA authentication parameter. The remote server herein may be an operator server. The operator server may allocate the NAA authentication parameter update information and a profile identifier corresponding to the information to the authentication management server. In a subsequent communication process, the terminal and the authentication management server use the updated authentication information to perform bidirectional authentication.

In still another optional implementation, the fourth message includes a second identifier, the fourth message is used to instruct the remote server to update, in the authentication management server, authentication information of a profile corresponding to the second identifier, and the first identifier and the second identifier correspond to a same profile.

In yet another optional implementation, the fourth message includes the authentication algorithm identifier and the profile identifier, where the fourth message is used to instruct the authentication management server to associate the authentication algorithm identifier with the profile identifier.

In yet another optional implementation, if the second message includes only the NAA authentication parameter update information, the LPA notifies the authentication management server, so that the authentication management server updates an authentication parameter corresponding to the profile to the NAA authentication parameter update information, and sends an acknowledgment message to the eUICC. After receiving the message, the eUICC uses the updated authentication information of the profile to perform bidirectional authentication with the network. After generating the NAA authentication parameter update information, the MNO server may first send the NAA authentication parameter update information to the authentication management server. The authentication management server may first cache the NAA authentication parameter update information, and after receiving an update completion notification of the eUICC, use the NAA authentication parameter update information to replace an old NAA parameter.

In yet another optional implementation, the first message further includes an authentication algorithm program.

In yet another optional implementation, before the LPA sends the second message to the profile corresponding to the target identifier, the method further includes: sending, by the LPA, a fifth message to the eUICC, where the fifth message includes the authentication algorithm program.

In yet another optional implementation, before the LPA receives the first message from the remote server, the method further includes: generating, by the LPA, prompt information, where the prompt information is used to prompt an operation option of updating authentication parameter information, and the operation option includes an acknowledgment option; and receiving, by the LPA, an operation of triggering the acknowledgment option. In addition, the LPA receives first metadata sent by the remote server, where the first metadata includes a profile content update identifier, and the profile content update identifier is used to indicate that the LPA does not need to obtain a user acknowledgment. Specifically, the profile content update identifier is used so that the LPA does not need to obtain a user acknowledgment before receiving a profile update package. The first metadata is metadata corresponding to the profile update package. The first metadata may alternatively be metadata corresponding to a profile content update file generated by an SM-DP+ server. The profile content update file may include the NAA authentication parameter update information. Optionally, the profile content update file may also include the authentication algorithm program.

In yet another optional implementation, the receiving, by an LPA, a first message from a remote server includes: receiving, by the LPA, a first RegisterEvent message sent by the remote server, where the first RegisterEvent message includes an address of a profile content management platform PCMP; sending, by the LPA, a second RegisterEvent message to the eUICC, where the second RegisterEvent message includes the PCMP address; receiving, by the LPA, a first request message sent by the eUICC, where the first request message includes an ICCID and the profile PCMP address; sending, by the LPA, a second request message to the profile PCMP based on the first request message, where the second request message includes the ICCID; and receiving, by the LPA, the first message, of the first network access application, that corresponds to the ICCID and that is sent by the profile content management platform.

In yet another optional implementation, the first message further includes profile content and firmware update request information, and the profile content and firmware update request information is used to indicate that the first message is used to update firmware and content of the profile corresponding to the target identifier. According to the embodiments of this application, a function of the first message can be determined based on a profile content and platform update identifier, to update a platform and the authentication information of the profile based on information carried in the first message. The firmware may be an eUICC operating system, or an eUICC platform and operating system. The firmware may also be referred to as eUICC platform firmware.

In yet another optional implementation, the first message further includes profile content update request information, and the profile content update request information is used to instruct the eUICC to update content of the profile corresponding to the first identifier.

According to the embodiments of this application, the LPA can update the authentication information in the eUICC for bidirectional authentication in a network attachment process, to improve communication security. Further, the authentication information can be synchronized between the authentication management server and the eUICC, and signaling overheads are low. In this way, the eUICC and the authentication management server can correctly perform bidirectional authentication after the update is completed. Further, the authentication information can be synchronized between the authentication management server and the eUICC, and more convenience is brought to the remote server. In this way, the eUICC and the authentication management server can correctly perform bidirectional authentication after the update is completed. Moreover, the network authentication algorithm can be updated, so that network communication is more secure. In addition, updating authentication information of a profile in an enabled state means updating authentication information in a network communication process, and communication security is improved.

According to a fourth aspect, a method for updating network access application authentication information is provided. The method includes:

sending, by a subscription manager-data preparation SM-DP+ server, a first message to an LPA, where the first message includes network access application NAA authentication parameter update information and a first identifier; receiving, by the SM-DP+ server, a second message, where the second message includes profile update completion information; and sending, by the SM-DP+ server, a third message to an operator server based on the second message, where the third message includes the profile update completion information, and the third message is used to instruct the operator server to update, in an authentication management server, authentication information of a profile corresponding to the first identifier.

In an optional implementation, the first identifier includes an ICCID or an issuer security domain subscription information set identifier.

In another optional implementation, the first notification message includes an authentication algorithm identifier and a profile identifier; and the second notification message includes the authentication algorithm identifier and the profile identifier, and the second notification message is used to instruct the authentication management server to associate the authentication algorithm identifier with the profile identifier.

In still another optional implementation, the first message further includes an authentication algorithm program, so that the LPA sends the authentication algorithm program to the eUICC before sending the NAA authentication parameter update information to the profile corresponding to the target identifier. The eUICC adds the authentication algorithm program to a telecom framework (Telecom Framework).

In yet another optional implementation, the first message further includes profile content update request information, and the profile content update request information is used to instruct the eUICC to update the authentication information of the profile corresponding to the first identifier. In yet another optional implementation, the second message includes a second identifier, the second message is used to instruct to update, in the authentication management server, authentication information of a profile corresponding to the second identifier, and the first identifier and the second identifier correspond to a same profile.

In yet another optional implementation, the first message further includes profile content and firmware update request information, and the profile content and firmware update request information is used to indicate that the first message is used to update firmware and content of the profile corresponding to the first identifier.

According to the embodiments of this application, the SM-DP+ server can update the authentication information in the eUICC for bidirectional authentication in a network attachment process, to improve communication security. Further, the authentication information can be synchronized between the authentication management server and the eUICC, and signaling overheads are low. In this way, the eUICC and the authentication management server can correctly perform bidirectional authentication after the update is completed. Further, the authentication information can be synchronized between the authentication management server and the eUICC, and more convenience is brought to the remote server. In this way, the eUICC and the authentication management server can correctly perform bidirectional authentication after the update is completed. Moreover, a network authentication algorithm can be updated, so that network communication is more secure. In addition, updating authentication information of a profile in an enabled state means updating authentication information in a network communication process, and communication security is improved.

According to a fifth aspect, a method for updating network access application authentication information is provided. The method is applicable to an operator server MNO server, and an eUICC has a profile installed. The method includes: sending, by the MNO server, a first message to the eUICC, where the first message includes network access application NAA authentication parameter update information and a first identifier, so that the eUICC updates authentication information of a profile corresponding to the first identifier based on the NAA authentication parameter update information; and receiving, by the MNO server, a second message sent by the eUICC, where the second message includes a second identifier, the second message is used to instruct the MNO server to update, in an authentication management server, authentication information of a profile corresponding to the second identifier, and the first identifier and the second identifier correspond to a same profile. The NAA authentication parameter update information includes at least one of a key Ki and an IMSI that are required for authentication with a network side.

In an optional implementation, the method further includes: creating, by the MNO server, an NAA authentication information list, where the list includes a correspondence between authentication information and a profile identifier; and generating NAA authentication update information when updating the NAA authentication information list.

In an optional implementation, the first message further includes an authentication algorithm program.

In an optional implementation, that the MNO server sends the NAA authentication update information to the terminal by using an SM-DP+ server, for the terminal to send the NAA authentication update information to the eUICC includes: The MNO server sends a remote management command to the SM-DP+ server, where the remote management command includes an EID, the NAA authentication update information, and a profile identifier, so that the SM-DP+ server sends the NAA authentication update information to the eUICC corresponding to the EID, where the remote management command is used to instruct to update authentication information corresponding to the profile to the NAA authentication update information; or the MNO server sends a profile download command to the SM-DP+ server, where the profile download command includes the NAA authentication update information and a profile identifier, so that the SM-DP+ server sends the NAA authentication update information to the eUICC corresponding to the profile identifier, where the remote management command is used to instruct the eUICC to update authentication information corresponding to the profile to the NAA authentication update information.

In an optional implementation, that the MNO server sends the NAA authentication update information to the terminal by using a PCMP, for the terminal to send the NAA authentication update information to the eUICC includes: The MNO server sends the NAA authentication information update package to the PCMP, where the NAA authentication information update package includes the NAA authentication update information and a profile identifier, and the MNO server sends a RegisterNotification message to an SM-DP+ server, where the RegisterNotification message includes an EID and a PCMP address, and the RegisterNotification message is used to instruct the management server to instruct the eUICC to obtain the NAA authentication update information corresponding to the profile identifier from the PCMP.

According to the embodiments of this application, the MNO server can update the authentication information in the eUICC for bidirectional authentication in a network attachment process, to improve communication security. Further, the authentication information can be synchronized between the authentication management server and the eUICC, and signaling overheads are low. In this way, the eUICC and the authentication management server can correctly perform bidirectional authentication after the update is completed. Further, the authentication information can be synchronized between the authentication management server and the eUICC, and more convenience is brought to the remote server. In this way, the eUICC and the authentication management server can correctly perform bidirectional authentication after the update is completed. Moreover, a network authentication algorithm can be updated, so that network communication is more secure. In addition, updating authentication information of a profile in an enabled state means updating authentication information in a network communication process, and communication security is improved.

According to a sixth aspect, a terminal is provided. The terminal has a function of implementing terminal behavior in any one or more of the first aspect, the second aspect, or the third aspect. The function may be implemented by hardware, or may be implemented by hardware executing corresponding software. The hardware or software includes one or more modules corresponding to the foregoing function.

According to a seventh aspect, an eUICC is provided. The terminal has a function of implementing eUICC behavior in the second aspect. The function may be implemented by hardware, or may be implemented by hardware executing corresponding software. The hardware or software includes one or more modules corresponding to the foregoing function.

According to an eighth aspect, an SM-DP+ server is provided. The terminal has a function of implementing SM-DP+ server behavior in the fourth aspect. The function may be implemented by hardware, or may be implemented by hardware executing corresponding software. The hardware or software includes one or more modules corresponding to the foregoing function.

According to a ninth aspect, an MNO server is provided. The terminal has a function of implementing MNO server behavior in the fifth aspect. The function may be implemented by hardware, or may be implemented by hardware executing corresponding software. The hardware or software includes one or more modules corresponding to the foregoing function.

According to a tenth aspect, a computer-readable storage medium is provided. The computer-readable storage medium stores a computer program. When executed by a processor, the computer program implements the method according to any one or more of the first aspect, the second aspect, the third aspect, the fourth aspect, or the fifth aspect.

According to an eleventh aspect, a computer program product including an instruction is provided. When the instruction is run a computer, the computer is enabled to perform the method according to any one or more of the first aspect, the second aspect, the third aspect, the fourth aspect, or the fifth aspect.

BRIEF DESCRIPTION OF DRAWINGS

FIG. 19 is an example of a bound profile update package according to an embodiment of the present invention;

FIG. 20 is another example of a bound profile update package according to an embodiment of the present invention;

FIG. 21 is still another example of a bound profile update package according to an embodiment of the present invention;

FIG. 22 is yet another example of a bound profile update package according to an embodiment of the present invention;

DESCRIPTION OF EMBODIMENTS

In the embodiments of the present invention, a UICC (universal integrated circuit card, universal integrated circuit card) is a removable smart card. A user can conveniently transfer information stored in the UICC from one terminal to another terminal by only removing the UICC card from the terminal and inserting it into the another terminal.

An eUICC can securely manage a profile remotely and/or locally. The eUICC can be installed on a terminal in a pluggable or non-pluggable manner. The eUICC may also be referred to as an embedded subscriber identity module (embedded subscriber identity module, eSIM) or a smart card.

An integrated circuit card identifier (integrated circuit card ID, ICCID) is used to uniquely identify one profile. The ICCID may also be referred to as a profile ID.

An eUICC identifier (eUICC-ID. EID) is used to uniquely identify an eUICC.

An eUICC information set (eUICC information Set, EIS) includes basic information about an eUICC, for example, an EID, a production date, total storage space, available storage space, a quantity of profiles currently stored on the eUICC, a type, and other information.

Only a file, an application, and the like inside an enabled profile (enabled profile) can be selected over an interface between a terminal and an eUICC. In other words, only an enabled profile can be used by the terminal to perform bidirectional authentication with a network device.

Policy rules are a series of rules used to control eUICC behavior or behavior of another entity that remotely manages an eUICC, for example, a condition that needs to be met for performing an operation.

Figure 1:
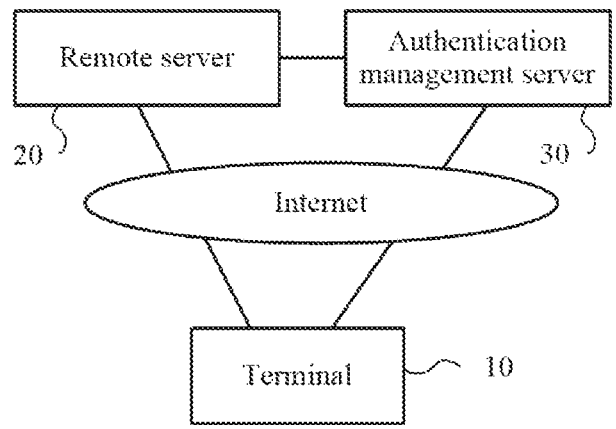
FIG. 1 is a schematic architectural diagram of a system according to an embodiment of the present invention.

FIG. 1 is a schematic architectural diagram of a system according to an embodiment of the present invention. As shown in FIG. 1, the system includes at least a terminal 10, a remote server 20, and an authentication management server 30. For example, the authentication management server 30 is an HSS or an AuC on a mobile network (public land mobile network, PLMN) accessed by the terminal 10. The mobile network may be a mobile network of 2G/3G/4G/5G or another standard. The remote server 20 may include one or more of an SM-DP+ server, an MNO server, a PCMP, or the like. The terminal 10 may include an LPA. Inside the terminal 10, the LPA provides a function of interacting with an eUICC. A main function of the LPA is subscription file download, service discovery, and UI interface provision for a user. By using the LPA, the user can manage a profile downloaded to the eUICC, for example, perform an operation such as enabling, disabling, or deletion on the profile.

Figure 2:
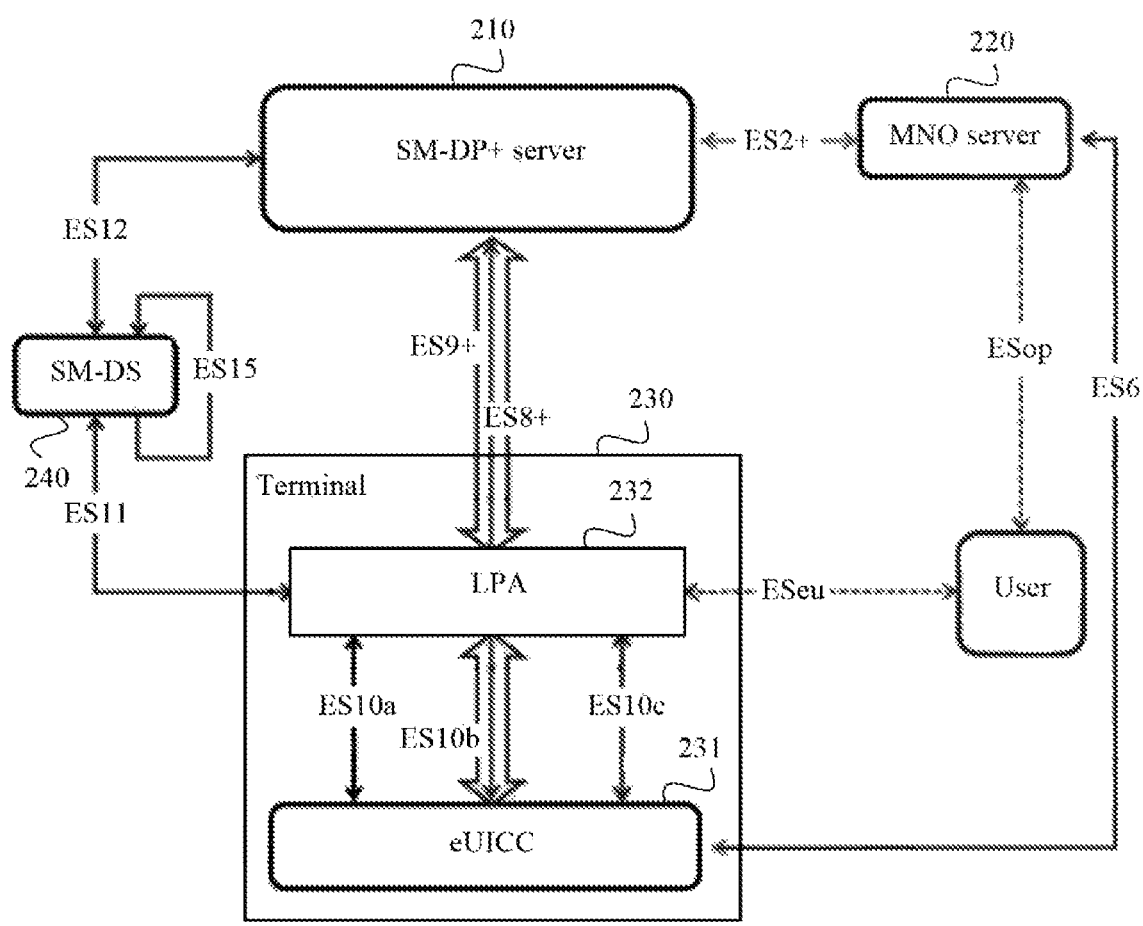
FIG. 2 is a schematic architectural diagram of another system according to an embodiment of the present invention.

FIG. 2 is a schematic architectural diagram of another system according to an embodiment of the present invention. A remote server in the system includes an SM-DP+ server 210. The SM-DP+ server 210 may be responsible for remote profile management, that is, the SM-DP+ server 210 may execute a remote management request of an operator, and send a remote management request to an eUICC 231 that downloads and installs a profile of the operator. The eUICC 231 executes the remote management request to implement remote management. The remote management request includes enabling, disabling, deletion, examination on a status of the eUICC 231, and the like. In addition, the SM-DP+ server 210 may generate, based on basic information (for example, an international mobile subscriber identity (international mobile subscriber identity. IMSI)) provided by a mobile network operator (mobile network operator, MNO) server 220, a profile that can be downloaded to the eUICC 231, and may also be referred to as a profile download server. A plurality of SM-DP+ servers 210 may be set, for example, a plurality of SM-DP+ servers 210 may be set by function. Further, an SM-DP+ server 210 used for remote management and an SM-DP+ server 210 used for profile generation and download may be set.

A subscription manager-discovery server (subscription manager-discovery service, SM-DS) 240 may provide a mechanism for the SM-DP+ server 210 to communicate with an LPA 232. The LPA 232 can obtain an address of the SM-DP+ server by communicating with the SM-DS 234.

For example, when the SM-DP+ server 210 has a profile downloaded to the eUICC 231, the SM-DP+ server 210 registers its address with the SM-DS 240.

When the SM-DP+ server 210 has a remote management command or a profile to be sent to the eUICC 231, the SM-DP+ server 210 registers its address with the SM-DS 240. After obtaining the address of the SM-DP, the LPA 232 can communicate with the SM-DP+ server 210 to download the profile or obtain the remote management command.

The SM-DP+ server 210 may communicate with the MNO server 220 over an ES2+ interface. The MNO server 220 may communicate with the eUICC 231 over an ES6 interface. The SM-DP+ server 210 may communicate with the LPA 232 over an ES9+ interface. The LPA 232 may communicate with the eUICC 231 over interfaces such as ES10a, ES10b, and ES10c. The SM-DP+ server 210 may communicate with the eUICC 231 over an ES8+ interface. The SM-DP+ server 210 may communicate with the SM-DS 240 over an ES12 interface. The SM-DSs 240 may communicate with each other over an ES15 interface. The SM-DS 240 may communicate with the LPA 232 over an ES11 interface. For details, refer to the standard GSMA SGP.22.

The system may further include an eUICC manufacturer (eUICC manufacturer, EUM) server, and an EUM may be an eUICC manufacturer for producing and selling eUICC cards. A certificate issuer (certificate issuer, CI) is used to issue a certificate to another entity, for example, a download server.

In the embodiments of the present invention, a terminal (Terminal) may also be referred to as a system, a subscriber unit, a subscriber station, a mobile station, a mobile console, a remote station, a remote terminal, a mobile device, a user terminal, a mobile terminal, a wireless communications device, a user agent, a user apparatus, or user equipment (user equipment, UE). For example, the terminal may be a cellular phone, a cordless phone, a smartwatch, a wearable device, a tablet device, an unmanned aerial vehicle, a vending machine, a sensor device, a session initiation protocol (session initiation protocol, SIP) phone, a wireless local loop (wireless local loop, WLL) station, a personal digital assistant (personal digital assistant, PDA), a handheld device with a wireless communication function, a computing device, a vehicle-mounted communication module, a smart meter, a smart home device, or another processing device connected to a wireless modem.

Figure 3:
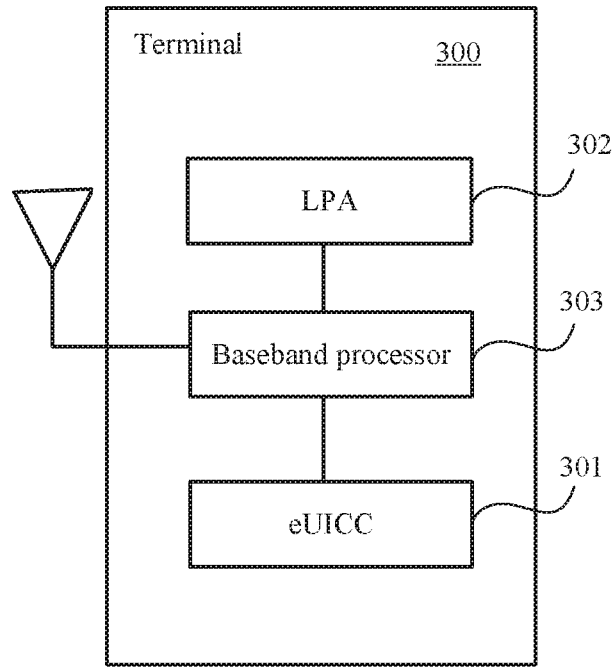
FIG. 3 is a schematic structural diagram of a terminal according to an embodiment of the present invention.

As shown in FIG. 3, a terminal 300 may include an application processing circuit, a baseband processing circuit, and an eUICC 301. The application processing circuit may include a processor, a memory, and the like. The memory stores a program required by an LPA module 302. The processor runs the program stored in the memory to implement a function of the LPA module 302. The LPA module 302 may alternatively be located in another memory of the terminal. The baseband processing circuit includes a radio frequency transceiver, a baseband processor 303, and a memory. The baseband processing circuit is mainly configured to implement wireless communication. By running a program stored in the memory, the baseband processor can support communication in networks of a plurality of standards, for example, can support communication in networks of standards such as 2G/3G/4G/5G. The baseband processing circuit and the application processing circuit may be integrated, or may be separately implemented by using different modules. The baseband processing circuit and the application processing circuit may share a memory, or each may include a memory.

Figure 4:
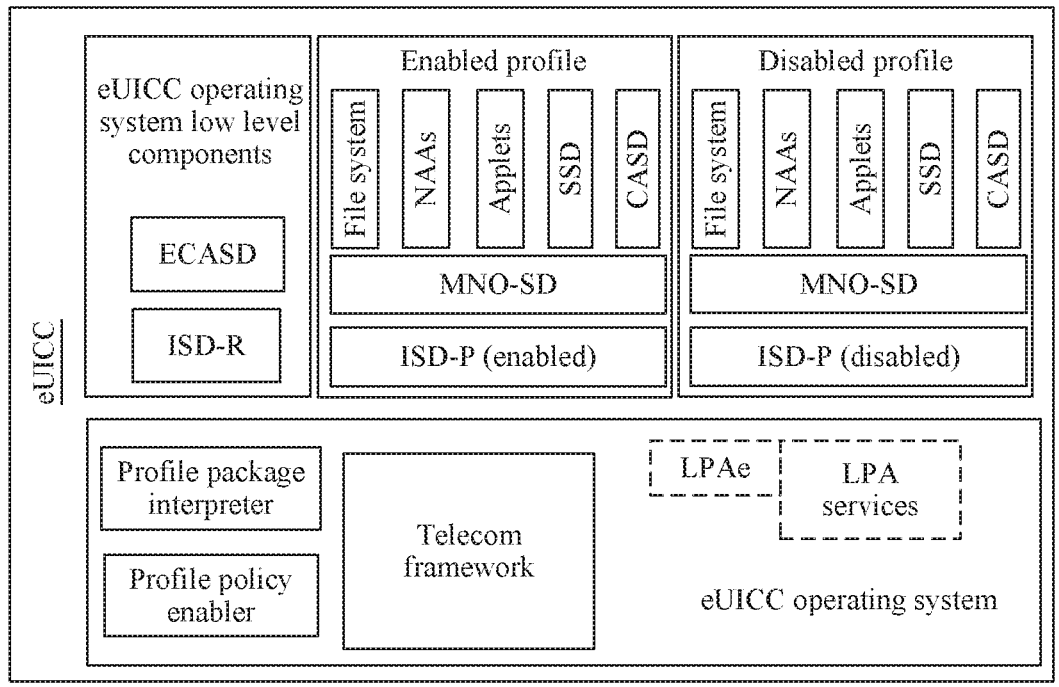
FIG. 4 is a schematic structural diagram of an eUICC according to an embodiment of the present invention.

FIG. 4 illustrates a software-level architecture of an eUICC, including an ISD-P part and a structure of an eUICC OS. The eUICC OS includes a high-level part (the eUICC operating system) and a low-level part (eUICC OS low level components). The high-level part of the eUICC OS mainly includes an LPA service (LPA in eUICC, LPAe), LPA services (LPA services), a telecom framework (Telecom Framework), a profile package interpreter (profile package interpreter), and a profile policy enabler (profile policy enabler). The low-level part of the eUICC OS mainly includes an issuer security domain root (issuer security domain root. ISD-R), an elliptic curve cryptography digital signature algorithm (elliptic curve cryptography digital signature algorithm, ECASD), and the like.

The ISD-R is mainly configured to create an ISD-P, and is responsible for managing life cycles of all ISD-Ps. Each eUICC has only one ISD-R. The ISD-R is installed and personalized by an EUM in an eUICC production process. The ISD-R cannot be deleted or disabled (disable).

The ECASD is mainly used to securely store a certificate and a key, to support a security domain on the eUICC. Each eUICC has only one ECASD. The EUM needs to install and personalize an ECASD in the eUICC production process.

The ECASD includes the following:
  eUICC private key (SK.EUICC.ECDSA): The eUICC private key is used to create an ECDSA signature.
  eUICC certificate (CERT.EUICC.ECDSA): The eUICC certificate is used for eUICC authentication. The eUICC certificate includes an eUICC public key (PK.EUICC.ECDSA), a public key (PK.CI.ECDSA) of a GSMA certificate issuer (CI), a certificate used for a public key user to verify a network element (for example, an SM-DP+ server) other than the eUICC. The ECASD may include a plurality of public keys of a same GSMA CI or different GSMA CIs.
  EUM certificate (CERT.EUM.ECDSA)
  EUM key set: The key set is used to update a key and a certificate.

The ECASD needs to provide the ISD-R with the following services:
  eUICC signature generation performed based on information provided by the ISD-R; and verification on a network element (for example, an SM-DP+ server) other than the eUICC performed by using a CI public key (PK.CI.ECDSA).

The ISD-P is also referred to as a profile domain, which is space used for storing a profile, and is used to decrypt and install a profile. The ISD-P stores a key used for secure communication with an SM-DP+ server other than the eUICC.

FIG. 4 illustrates two profiles, where one is an enabled profile, and the other is a disabled profile. Each profile further includes a file system, a plurality of NAAs, applets (applets), an SSD, a CASD, and an MNO-SD.

The eUICC operating system includes a platform service manager (platform service manager) and the telecom framework (telecom framework). The platform service manager is configured to provide a platform management function and a policy rule execution mechanism. The telecom framework is configured to provide a standardized authentication algorithm for an NAA, and can further configure an algorithm by using a requirement parameter.

Figure 5:
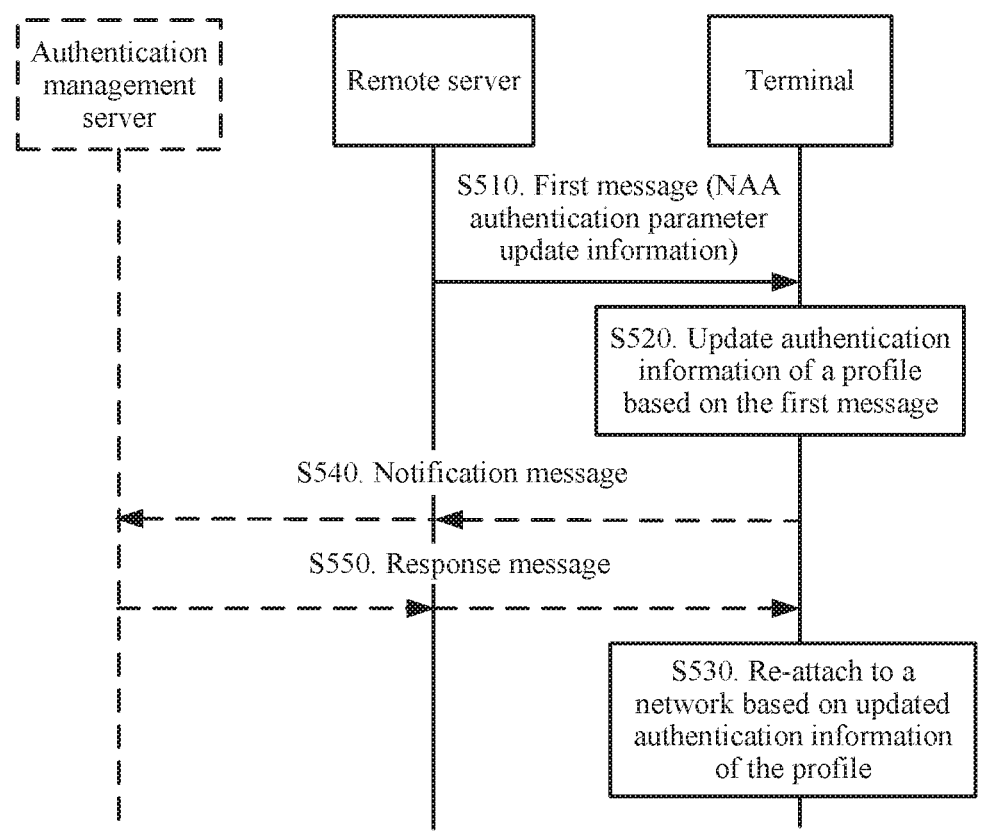
FIG. 5 is a signaling interworking diagram of a method for updating network access application authentication information according to an embodiment of the present invention.

FIG. 5 is a signaling interworking diagram of a method for updating network access application authentication information according to an embodiment of the present invention. As shown in FIG. 5, the method specifically includes the following steps.

S510. A remote server sends a first message to a terminal. The first message includes NAA authentication parameter update information and a first identifier. The first message may be an NAA authentication information update message. For example, the first message may be a remote management command, a profile update package, an update system files message, or an NAA authentication information update message obtained based on an event record. The first identifier is used to identify a target profile. The first identifier may include an ICCID or an issuer security domain-profile identifier (for example, an ISD-P application identifier (application identifier, AID)).

The remote server may include an SM-DP+ server and an MNO server. The SM-DP+ server may generate the first message based on an NAA authentication information update message from the MNO server. The MNO server may initiate, at a specified period or as required, an update of NAA authentication information used for the terminal to access a network, so as to improve communication security.

First, the MNO server may generate the NAA authentication parameter update information. For example, the NAA authentication parameter update information may include at least one of a Ki and an IMSI.

Subsequently, the MNO server needs to send the NAA authentication parameter update information to the SM-DP+ server, so that the SM-DP+ server generates the first message after performing processing such as encryption, and sends the first message to the terminal.

The terminal may receive the first message after obtaining a user acknowledgment.

In addition, the terminal receives first metadata sent by the remote server, where the first metadata includes a profile content update identifier, and the profile content update identifier is used to indicate that the terminal does not need to obtain a user acknowledgment. Specifically, the profile content update identifier is used so that the terminal does not need to obtain a user acknowledgment before receiving a profile update package. The first metadata is metadata corresponding to the profile update package. The first metadata may alternatively be metadata corresponding to a profile content update file generated by the SM-DP+ server. The profile content update file may include the NAA authentication parameter update information. Optionally, the profile content update file may also include an authentication algorithm program.

S520. The terminal updates authentication information of a profile corresponding to the first identifier based on the first message.

The terminal may determine, based on a tag carried in the first message, whether the first message includes the NAA authentication parameter update information. If the first message includes the NAA authentication parameter update information, the terminal updates an NAA authentication parameter of the profile corresponding to the first identifier based on the NAA authentication parameter update information.

For example, the first message may include profile content update request information, and the profile content update request information is used to indicate that the first message is used to update content of the profile corresponding to the first identifier. In other words, if the first message includes the profile content update request information, it indicates that the first message further includes profile update content. In this embodiment, the profile update content is the NAA authentication parameter update information. The first message may further include the first identifier. Specifically, the first identifier may be stored in a StoreMetadata (StoreMetadata) part in the profile update package, and the first identifier is used to indicate a to-be-updated target profile. The first identifier may alternatively be placed in an encrypted data part. The encrypted data part may be located after a profile protection key or StoreMetadata. Optionally, the profile update content may also include the authentication algorithm program. In the profile update package, the authentication algorithm program may be located before or after the NAA authentication parameter update information. This is not specifically limited in this application.

S530. The terminal detaches from the network, and re-attaches to the network based on updated authentication information of the profile.

After the authentication information is updated, the terminal needs to use the updated authentication information to communicate with a mobile communications network. Further, in a process of communication between the terminal and the mobile communications network, the NAA authentication parameter update information is mainly used for bidirectional authentication with the network after the network attachment. Specifically, the terminal needs to detach from the network, and then uses the NAA authentication parameter update information to re-attach to the network. For example, after an update of authentication information of a profile in an eUICC is completed, the eUICC may notify a baseband processor. The baseband processor first detaches from the network, and then performs bidirectional authentication with the network based on an updated parameter of the profile during the network attachment. In a bidirectional authentication process of the network attachment, both parties of bidirectional authentication perform operations based on an NAA authentication parameter (for example, the NAA authentication parameter update information) and the authentication algorithm program, and perform verification based on an obtained result.

Figure 6:
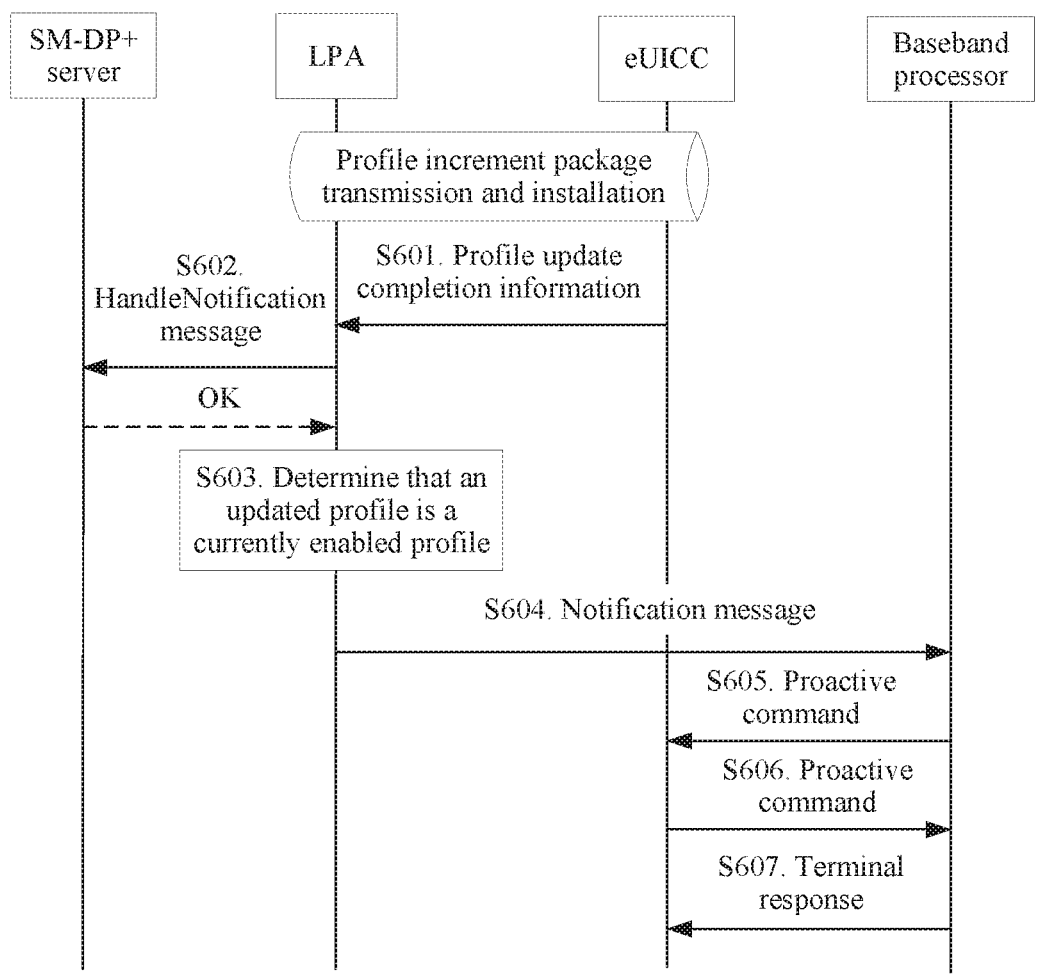
FIG. 6 is a signaling interworking diagram of another method for updating network access application authentication information according to an embodiment of the present invention.

For example, as shown in FIG. 6, an LPA sends the profile update package to the eUICC by using a LoadBoundPackage (LoadBoundPackage) function.

S601. After completing the update of the profile, the eUICC sends profile update completion information to the LPA, where the profile update completion information may be carried by using a response application protocol data unit (Response Application Protocol Data Unit, R-APDU). The profile update completion message sent by the eUICC to the LPA may be a third message. The profile update completion information may include the ICCID. The profile update completion information may also be equivalent to a profile update result message.

S602. The LPA sends a HandleNotification (HandleNotification) message to the SM-DP+ server, where the HandleNotification message includes the profile update result message. The HandleNotification message sent by the LPA to the SM-DP+ server may be a fourth message. The profile update result message may include the ICCID.

S603. After completing sending of the HandleNotification message, the LPA determines whether an updated profile is a currently enabled profile.

S604. The LPA sends a notification message to the baseband processor, where the notification message is used to enable the baseband processor to obtain a proactive command of the eUICC. In this embodiment, the proactive command is a refresh command. Optionally, the refresh command may carry an NAA initialization and file change notification (NAA Initialization and File Change notification).

S605. The baseband processor obtains the proactive command of the eUICC.

S606. The eUICC sends the proactive command to the baseband processor.

S607. The eUICC receives a terminal response (Terminal Response) command sent by the baseband processor. The baseband processor loads the updated authentication information of the profile, and performs bidirectional authentication with the network by using the updated authentication information during network attachment.

Optionally, after receiving the terminal response command, the eUICC may re-enable the profile, and send a response message to the LPA. The LPA sends a notification message to the baseband processor, where the notification message is used to instruct the baseband processor to load the updated authentication information of the profile, and perform bidirectional authentication with the network by using the updated authentication information during network attachment.

In addition, the terminal may further instruct an authentication management server to update authentication information of the profile based on the NAA authentication parameter update information. The following steps may be further included after S520.

S540. The terminal may instruct the authentication management server to update the authentication information corresponding to the profile.

The terminal may instruct, by using the remote server, the authentication management server to update the authentication information corresponding to the profile, so that the authentication management server performs bidirectional authentication with the terminal based on the NAA authentication parameter update information in a process in which the terminal attaches to the network.

In addition, the remote server may first send the NAA authentication parameter update information to the authentication management server, and the authentication management server may first cache the NAA authentication parameter update information. After determining that the update of the authentication information of terminal is completed (for example, a second message is received), the authentication management server updates the authentication information corresponding to the terminal to the NAA authentication parameter update information.

In an implementation in which the terminal instructs the authentication management server to update the authentication information corresponding to the profile, when the remote server includes a first remote server and a second remote server, the terminal sends the second message to the first remote server, where the second message includes a second identifier, and the second message is used to instruct the second remote server to update, in the authentication management server, authentication information of a profile corresponding to the second identifier. Specifically, after receiving the second message, the first remote server sends a third message to the second remote server, where the third message carries a third identifier, and the third message is used to instruct the second remote server to update, in the authentication management server, authentication information of a profile corresponding to the third identifier. The first identifier, the second identifier, and the third identifier correspond to a same profile. The first identifier, the second identifier, and the third identifier may be the same or different.

For example, the first identifier, the second identifier, and the third identifier may all be the ICCID.

For another example, the second identifier may be a session identifier or the ICCID. The first remote server may be an SM-DP+ server or a PCMP. After updating the authentication information of the profile, the eUICC may send profile update completion result information to the LPA. The profile update completion information may be carried by using a response application protocol data unit (Response Application Protocol Data Unit, R-APDU). The terminal sends the second message to the first remote server by using the LPA, where the second message may be a HandleNotification (HandleNotification) message, and the second message includes a session identifier (TransactionID) (the second identifier) and profile update result information. Optionally, the second message may alternatively carry the ICCID (the second identifier). After receiving the second message, the first remote server may send the third message to the second remote server. The third message may be HandleDownloadProgressInfo (HandleDownloadProgressInfo), and the third message may include a matching identifier (the third identifier) and the profile update result information. The first remote server may find a corresponding matching identifier based on the session identifier. Optionally, the first remote server may find a corresponding matching identifier and ICCID based on the session identifier. Optionally, the third message may further include the ICCID (the third identifier). The second remote server updates, in the authentication management server, the authentication information of the profile corresponding to the third identifier. For example, the second remote server may be an operator server, and the authentication management server may be an HSS or an AuC. The MNO server may update authentication information of a profile corresponding to the ICCID to the HSS. The authentication information may be at least one of a Ki and an IMSI. The MNO server may allocate the new authentication information and the ICCID to the HSS, and the HSS updates authentication information of the corresponding ICCID based on the new authentication information. Optionally, the MNO server may allocate the new authentication information and the ICCID to the HSS before issuing a command used for updating the authentication information of the profile in the eUICC. After receiving the third message, the MNO server instructs the HSS to use the new authentication information to replace the old authentication information.

In an example in which the remote server includes an SM-DP+ server and an MNO server, the terminal may instruct, by using the SM-DP+ server and the MNO server, the authentication management server to update the authentication information corresponding to the profile. Specifically, the terminal may send the second message to the SM-DP+ server, and the SM-DP+ server may send the third message to the MNO server. After determining, based on the third message, that the update of the authentication information of the terminal is completed, the MNO server sends a fourth message to the authentication management server, to instruct the authentication management server to update the authentication information corresponding to the profile. After determining, based on the third message, that the update of the authentication information of the terminal is completed, the MNO server may alternatively directly update, in the authentication management server, the authentication information corresponding to the profile. The third message includes the profile update completion information. Optionally, the fourth message may include the profile update completion information and a profile identifier. Optionally, the fourth message may alternatively carry a profile identifier and the profile update completion information. In addition, the profile update completion information may include the profile identifier. The third message may include only an authentication information update result. Alternatively, the fourth notification message further includes a profile identifier in addition to the profile update completion information. Alternatively, the third message includes a matching identifier. After receiving the third message, the MNO server determines a profile identifier based on the matching identifier. The MNO server generates the fourth message based on the profile identifier, and sends the fourth message to the authentication management server. The fourth message includes a fourth identifier, and the fourth message is used to instruct the authentication management server to update authentication information of a profile corresponding to the fourth identifier. The first identifier, the second identifier, the third identifier, and a fifth identifier correspond to a same profile.

In an example in which the remote server includes a PCMP and an MNO server, the terminal may send the second message to the PCMP, and the PCMP may send the third message to the MNO server, so that the MNO server generates a fourth message based on the third message, and sends the second message to the authentication management server.

In another implementation in which the terminal instructs the authentication management server to update the authentication information corresponding to the profile, the terminal sends a fifth message to the remote server, where the fifth message includes a fifth identifier, and the fifth message is used to instruct the remote server to update, in the authentication management server, authentication information of a profile corresponding to the fifth identifier. The first identifier and the fifth identifier correspond to a same profile.

For example, the remote server may include an MNO server, and the MNO server may directly communicate with an interface on the terminal, for example, communicate over an ES6+ interface.

For another example, the terminal may send a fifth message to the remote server, where the fifth message is used to instruct the remote server to send a sixth message to the authentication management server. Optionally, the fifth message may include a profile identifier. For example, when the remote management server does not send the NAA authentication parameter update information to the authentication management server in advance, the remote server may determine the NAA authentication parameter update information based on the profile identifier carried in the fifth message, and include the profile identifier and the NAA authentication parameter update information in the sixth message and send the sixth message to the authentication management server. Alternatively, when the remote management server sends the NAA authentication parameter update information to the authentication management server in advance, the remote server may generate the sixth message based on the profile identifier carried in the fifth message, and send the sixth message to the authentication management server.

After receiving the sixth message, the authentication management server updates authentication information of a profile corresponding to the profile identifier.

For another example, the terminal may send a fifth message to the remote server, where the fifth message is used to instruct the remote server to send a sixth message to the authentication management server. The fifth message may alternatively be used to instruct the remote server to update, in the authentication management server, authentication information of a profile corresponding to a profile identifier. The fifth message includes a matching identifier (matchingID) (a fifth identifier), and the matching identifier is used to identify an event that the authentication information of the profile corresponding to the first identifier is updated. The remote server may determine the first identifier based on the matching identifier, and include the first identifier in the second message and send the second message to the authentication management server. The first identifier may be the profile identifier. In addition, the matching identifier may alternatively be used to determine the NAA authentication parameter update information. The remote server may include the first identifier and the NAA authentication parameter update information in the sixth message and send the sixth message to the authentication management server.

After receiving the sixth message, the authentication management server updates the authentication information of the profile corresponding to the first identifier.

For another example, the terminal may send a fifth message to the remote server, where the fifth message is used to indicate that the update of the authentication information of the terminal has been completed. After determining that the authentication information of the terminal is updated, the remote server sends a sixth message to the authentication management server. Optionally, the fifth message includes a profile identifier. Alternatively, the fifth message includes a matching identifier, and the remote server may determine a profile identifier based on the matching identifier.

S550. The authentication management server sends a seventh message to the terminal. Optionally, the seventh message is a response message, and the response message is used to acknowledge that the authentication information corresponding to the profile identifier has been updated on an authentication management server side. The response message may be further used to instruct the terminal to access the network based on the updated authentication information. Optionally, the response message includes the profile identifier. The authentication management server may send the response message to the terminal by using the remote server.

After receiving the response message, the terminal may perform step S530.

In addition, the terminal may alternatively perform step S530 after completing the update of the authentication information of the profile based on the first message.

According to this embodiment of this application, the authentication information for bidirectional authentication in the terminal in a network attachment process can be updated, to improve communication security. Further, the authentication information can be synchronized between the authentication management server and the eUICC, and signaling overheads are low. In this way, the eUICC and the authentication management server can correctly perform bidirectional authentication after the update is completed. Further, the authentication information can be synchronized between the authentication management server and the eUICC, and more convenience is brought to the remote server. In this way, the eUICC and the authentication management server can correctly perform bidirectional authentication after the update is completed. In addition, updating authentication information of a profile in an enabled state means updating authentication information in a network communication process, and communication security is improved.

Figure 7:
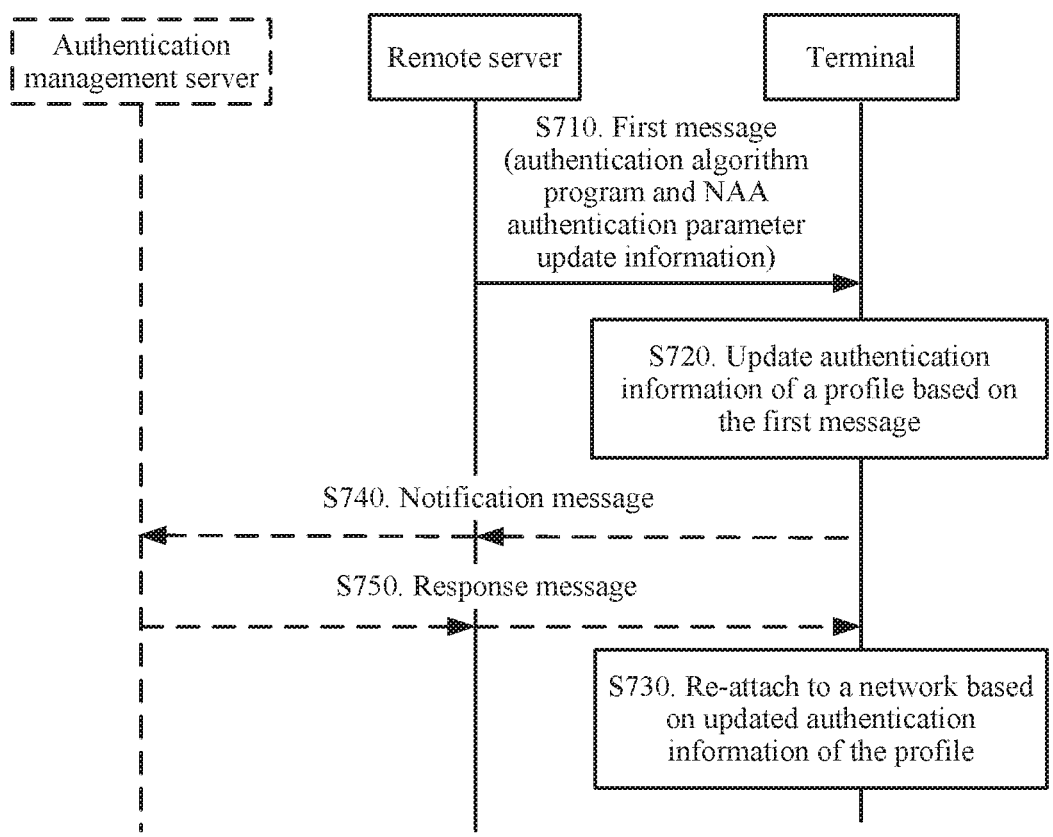
FIG. 7 is a signaling interworking diagram of still another method for updating network access application authentication information according to an embodiment of the present invention.

FIG. 7 is a signaling interworking diagram of another method for updating network access application authentication information according to an embodiment of the present invention. As shown in FIG. 7, the method specifically includes the following steps.

S710. A remote server sends a first message to a terminal. The first message includes NAA authentication parameter update information, an authentication algorithm program, and a first identifier. The first message may be an NAA authentication information update message. For example, the first message may be a remote management command, a profile update package, an update system files message, or an NAA authentication update message obtained based on an event record. The first identifier is used to identify a target profile. The first identifier may include an ICCID or an issuer security domain-profile identifier (for example, an ISD-P application identifier (application identifier. AID)).

The remote server may include an SM-DP+ server and an MNO server. The SM-DP+ server may generate the first message based on the NAA authentication parameter update information and the authentication algorithm program from the MNO server. The MNO server may initiate, at a specified period or as required, an update of authentication information used for the terminal to access a network, so as to improve communication security.

First, the MNO server may generate the NAA authentication parameter update information and the authentication algorithm program. For example, the MNO server generates authentication algorithm programs for different card manufacturer hardware versions, eUICC OS versions, eUICC capabilities (Capability), and the like.

Subsequently, the MNO server needs to send the NAA authentication parameter update information and the authentication algorithm program to the SM-DP+ server, so that the SM-DP+ server generates the first message after performing processing such as encryption, and sends the first message to the terminal.

S720. The terminal updates authentication information of a profile corresponding to the first identifier based on the NAA authentication parameter update information and the authentication algorithm program.

The terminal may determine, based on a tag carried in the first message, whether the first message includes the NAA authentication parameter update information and the authentication algorithm program. If the first message includes the NAA authentication parameter update information and the authentication algorithm program, the terminal adds the authentication algorithm program to a telecom framework of an eUICC, and updates an NAA authentication parameter of the profile corresponding to the target identifier based on the NAA authentication parameter update information. Specifically, the authentication algorithm program may be added to the telecom framework on the eUICC. After installation of the authentication algorithm program is completed, the terminal updates the authentication information of the profile corresponding to the first identifier based on the NAA authentication parameter update information.

For example, the first message may include profile content and firmware update request information, and the profile content and firmware update request information is used to indicate that the first message is used to update firmware and content of the profile corresponding to the target identifier. In other words, if the first message includes the profile content and firmware update request information, it indicates that the first message further includes the NAA authentication parameter update information and the authentication algorithm program.

S730. The terminal detaches from the network, and re-attaches to the network based on updated authentication information of the profile.

This step can be understood through mutual reference with step S530 in the foregoing embodiment. A difference lies in the following: In step S530, only an NAA authentication parameter of a profile is updated. In contrast, in step S630, an NAA authentication parameter corresponding to a profile and eUICC firmware both are updated and an information algorithm program is added to an algorithm library.

In addition, after updating an authentication algorithm and an NAA authentication parameter, the terminal may further instruct an authentication management server to associate a user with the updated authentication information. The user may be indicated by using a profile identifier, and the updated authentication information may be indicated by using an authentication algorithm identifier. The following steps may be further included after S520.

S740. The terminal may instruct the authentication management server to update the authentication information corresponding to the profile, for example, instruct the authentication management server to associate the NAA authentication parameter update information, the authentication algorithm identifier, and the profile identifier.

The terminal may instruct, by using the remote server, the authentication management server to associate the profile identifier, the NAA authentication parameter update information, and the authentication algorithm identifier. In this way, in a process in which the terminal attaches to the network, the authentication management server determines, based on an association relationship among the profile identifier, the NAA authentication parameter update information, and the authentication algorithm identifier, an authentication algorithm and performs bidirectional authentication with the terminal.

Specifically, if the terminal updates an NAA authentication parameter and an authentication algorithm program, the authentication management server updates authentication information corresponding to the profile identifier to the NAA authentication parameter update information and the authentication algorithm program, and performs bidirectional authentication with the terminal by using the NAA authentication parameter update information and the authentication algorithm program.

In addition, the remote server may first send the NAA authentication parameter update information and the authentication algorithm program (or the authentication algorithm ID) to the authentication management server, and the authentication management server may first cache the NAA authentication parameter update information and the authentication algorithm program. After determining that the update of authentication information of the terminal is completed, the authentication management server updates authentication information corresponding to the terminal to the NAA authentication parameter update information and the authentication algorithm ID.

For an implementation in which the terminal instructs the authentication management server to update the authentication information corresponding to the profile, refer to the description of S540 in the embodiment shown in FIG. 5.

In addition, when instructing the authentication management server to update the authentication information corresponding to the profile, the terminal further indicates the authentication algorithm identifier.

For example, the terminal may send a third message to the remote server, where the third message is used to instruct the remote server to send a second message to the authentication management server. Optionally, the second message includes the authentication algorithm identifier, the NAA authentication parameter update information, and the profile identifier. Optionally, the third message may include the authentication algorithm identifier, the NAA authentication parameter update information, and the profile identifier. For example, when the remote management server does not send the NAA authentication parameter update information and the authentication algorithm program (or the authentication algorithm ID) to the authentication management server in advance, the remote server may determine the NAA authentication parameter update information and the authentication algorithm program (or the authentication algorithm ID) based on the authentication algorithm identifier and the NAA authentication parameter update information that are carried in the third message, and update authentication information corresponding to the profile identifier to the NAA authentication parameter update information and the authentication algorithm program (or the authentication algorithm ID) and send the NAA authentication parameter update information and the authentication algorithm program (or the authentication algorithm ID) to the authentication management server. Alternatively, when the remote management server sends the NAA authentication parameter update information and the authentication algorithm program to the authentication management server in advance, the remote server may generate the second message based on the profile identifier carried in the third message, and send the second message to the authentication management server.

For another example, the terminal may send a fourth message to the remote server, where the fourth message is used to instruct the remote server to send a second message to the authentication management server. The fourth message includes a matching identifier (matchingID), where the matching identifier is used to identify an event that the authentication information corresponding to the target identifier is updated. The remote server may determine the target identifier, the NAA authentication parameter update information, and the authentication algorithm program (or the authentication algorithm ID) based on the matching identifier, where the target identifier may be the profile identifier. The remote server may include the target identifier in the second message and send the second message to the authentication management server. Alternatively, the remote server may include the target identifier and the NAA authentication parameter update information in the second message and send the second message to the authentication management server.

For another example, the terminal may send a fifth message to the remote server, where the fifth message is used to indicate that the update of the authentication information of the terminal has been completed. After determining that the authentication information of the terminal is updated, the remote server sends a second message to the authentication management server. Optionally, the fifth message may include the authentication algorithm identifier and the profile identifier. Alternatively, the fifth message includes a matching identifier.

S750. The authentication management server sends a response message to the terminal. The response message is used to acknowledge that the authentication algorithm corresponding to the profile identifier has been associated on an authentication management server side. The response message may be further used to instruct the terminal to access the network based on the updated authentication information. Optionally, the response message includes the profile identifier. The authentication management server may send the response message to the terminal by using the remote server.

After receiving the response message, the terminal may perform step S730.

In addition, the terminal may alternatively perform step S730 after completing the update of the authentication information of the profile based on the first message.

The NAA authentication information can be updated, and communication security can be improved by periodically or aperiodically updating the NAA authentication information and the authentication algorithm program. In this way, the communication security can still be ensured even when information such as a user key Ki or an IMSI is leaked.

According to this embodiment of this application, the network authentication algorithm and the NAA authentication parameter can be updated, so that network communication is more secure.

Figure 8:
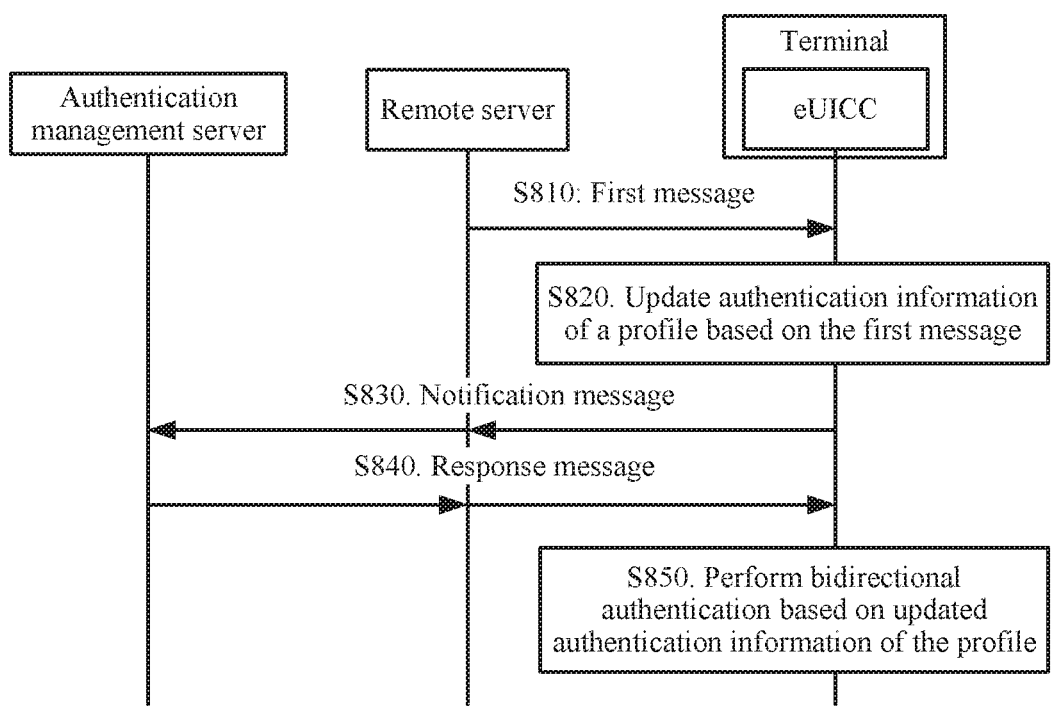
FIG. 8 is a signaling interworking diagram of yet another method for updating network access application authentication information according to an embodiment of the present invention.

FIG. 8 is a signaling interworking diagram of another method for updating network access application authentication information according to an embodiment of the present invention. As shown in FIG. 8, a remote server may include an MNO server, and the MNO server may directly communicate with an interface on a terminal, for example, communicate over an ES6+ interface. The method specifically includes the following steps.

S810. The MNO server sends a first message to an eUICC. The first message includes NAA authentication parameter update information and a target identifier. The target identifier may be an ISD-P AID, for example, an MNO-SD AID.

In another optional implementation, the first message may further include an authentication algorithm program.

The MNO server generates the NAA authentication parameter update information, generates the first message after performing processing such as encryption on the NAA authentication parameter update information, and sends the first message to the eUICC.

In another optional implementation, the MNO server generates the NAA authentication parameter update information and the authentication algorithm program, generates the first message after performing processing such as encryption on the NAA authentication parameter update information and the authentication algorithm program, and sends the first message to the eUICC.

S820. The eUICC updates authentication information of a profile based on the first message.

If the first message includes the authentication algorithm program, the authentication algorithm program is first added to the eUICC. Specifically, the authentication algorithm program may be added to a telecom framework on the eUICC. After the adding of the authentication algorithm program is completed, the eUICC updates authentication information of a profile corresponding to the target identifier based on the NAA authentication parameter update information.

If the first message includes only the NAA authentication parameter update information, the eUICC updates the authentication information of the profile corresponding to the target identifier based on the NAA authentication parameter update information.

The eUICC may determine, based on a tag carried in an NAA authentication message, whether the NAA authentication message includes the authentication algorithm program.

S830. The eUICC sends a second message to an authentication management server. The second message is used to instruct the authentication management server to update authentication information corresponding to a profile identifier. Optionally, the second message includes an authentication algorithm identifier and the profile identifier. Alternatively, the second message includes the profile identifier. Alternatively, the second message includes an authentication algorithm identifier, the NAA authentication parameter update information, and the profile identifier.

The terminal may send the second message by using the MNO server.

For example, the eUICC may send a third message to the MNO server, where the third message includes profile update completion information. The MNO server generates the second message based on information included in the received third message, and sends the second message to the authentication management server.

The third message may include any of the following information:

the authentication algorithm identifier and the profile identifier; the profile identifier; the authentication algorithm identifier, the NAA authentication parameter update information, and the profile identifier, and a matching identifier.

In addition, the third message is used to instruct the remote server to send the second message to the authentication management server. Alternatively, the third message is used to indicate that the update of the authentication information of the terminal has been completed. After determining that the authentication information of the terminal is updated, the remote server sends the second message to the authentication management server.

S840. The authentication management server sends a third message to the eUICC. The third message is used to acknowledge that the authentication information corresponding to the profile identifier has been updated on an authentication management server side. The response message may be further used to instruct the eUICC to perform bidirectional authentication with a network based on the NAA authentication parameter update information. Optionally, the response message includes the profile identifier.

That the authentication information has been updated on an authentication management server side may include: An authentication algorithm has been associated with the profile identifier; or an NAA authentication parameter corresponding to the profile identifier is updated to the NAA authentication parameter update information.

S850. The eUICC performs bidirectional authentication based on updated authentication information of the profile.

After the update performed in the eUICC based on the NAA authentication parameter update information is completed, a baseband processor may be notified, so that network attachment is performed based on an updated authentication parameter of the profile.

According to this embodiment of this application, the MNO server can update the authentication information for bidirectional authentication in a network attachment process, to improve communication security. Further, the authentication information can be synchronized between the authentication management server and the eUICC, and signaling overheads are low. In this way, the eUICC and the authentication management server can correctly perform bidirectional authentication after the update is completed. Further, the authentication information can be synchronized between the authentication management server and the eUICC, and more convenience is brought to the remote server. In this way, the eUICC and the authentication management server can correctly perform bidirectional authentication after the update is completed. Moreover, a network authentication algorithm can be updated, so that network communication is more secure. In addition, updating authentication information of a profile in an enabled state means updating authentication information in a network communication process, and communication security is improved.

Figure 9A:
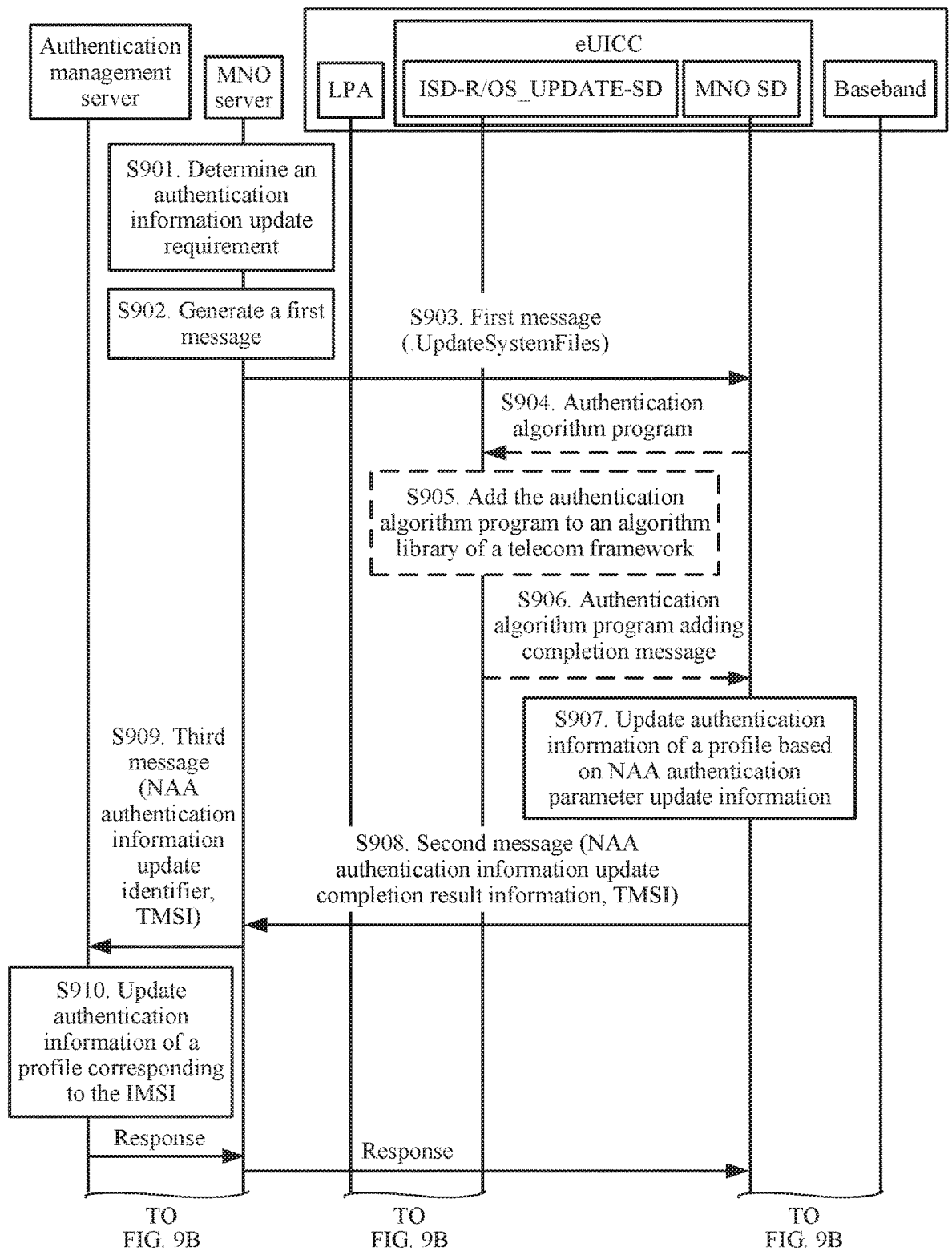
FIG. 9A and FIG. 9B are a signaling interworking diagram of yet another method for updating network access application authentication information according to an embodiment of the present invention.
Figure 9B:
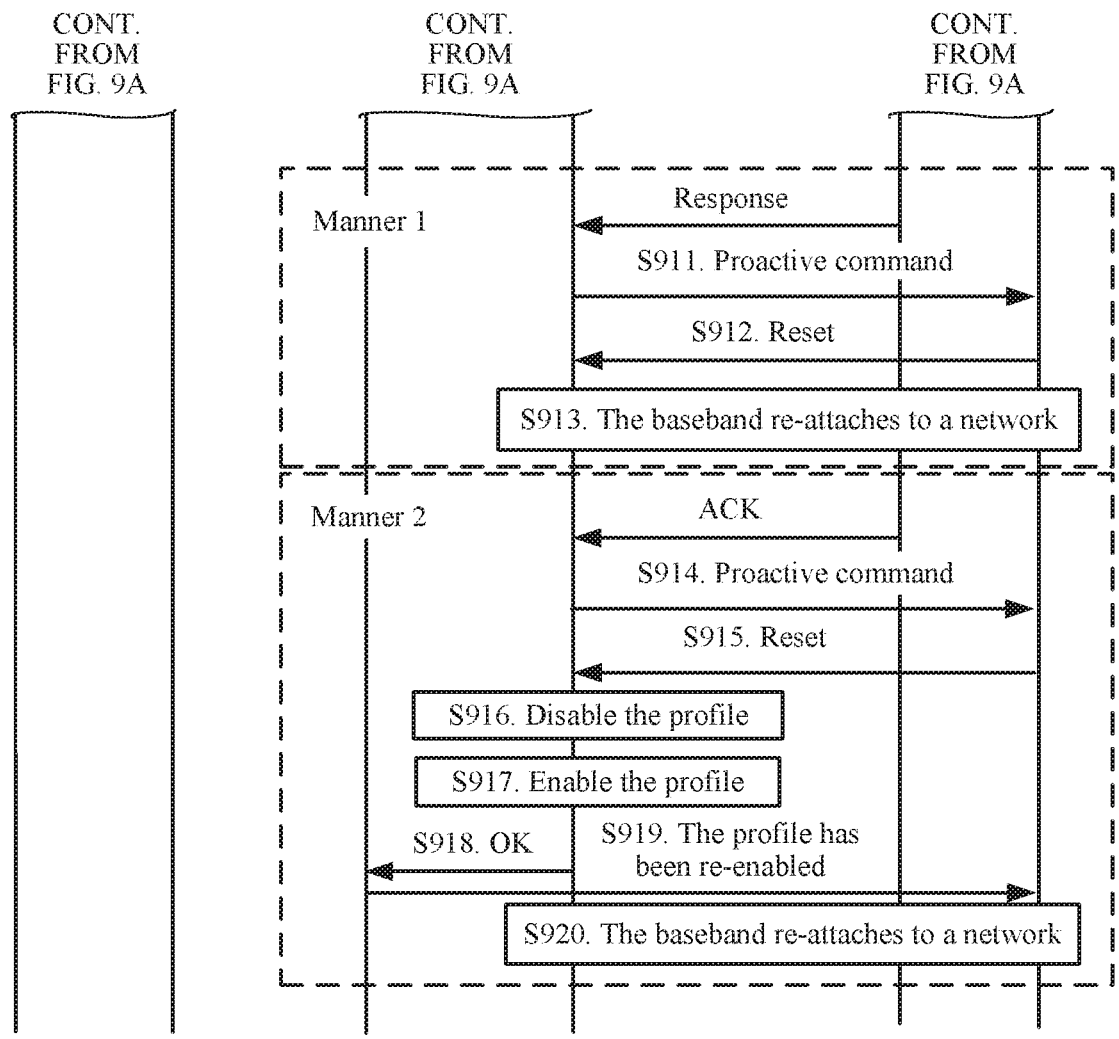

FIG. 9A and FIG. 9B are a signaling interworking diagram of still another method for updating network access application authentication information according to an embodiment of the present invention. As shown in FIG. 9A and FIG. 9B, an update of authentication information required for a terminal to access a network is described in detail by using an example in which a remote server is an MNO server and an authentication management server is an HSS. The terminal includes an LPA, a baseband processor, and an eUICC, and the eUICC includes an MNO SD and an ISD-R. The method specifically includes the following steps.

S901. The MNO server determines an authentication information update requirement.

The authentication information update requirement may include an NAA authentication parameter update and an authentication algorithm update. The MNO server may generate NAA authentication parameter update information. Optionally, the MNO server may further generate an authentication algorithm program. For example, the MNO server may generate a plurality of NAA algorithm programs for different card manufacturer hardware versions, operating system versions, and UICC capabilities, and may further create an authentication algorithm program list. The list includes NAA authentication algorithm identifiers of different versions, corresponding card manufacturer identifiers, card manufacturer hardware versions, operating system versions, UICC capabilities, and the like. The MNO server may initiate an NAA authentication information update every time a new authentication algorithm program is generated or at a specified time interval.

S902. The MNO server generates a first message.

After the MNO server determines the NAA authentication information update requirement, the MNO server generates the first message (for example, an NAA authentication update message), where the first message includes a target identifier (for example, an MNO SD address) and the NAA authentication parameter update information. Optionally, the NAA authentication update message may further include the authentication algorithm program, and the NAA authentication information update message may be an update system files (update system files) message.

S903. The MNO server sends the first message to the specified MNO-SD.

S904. The MNO-SD identifies the first message, and sends the authentication algorithm program to the ISD-R when determining that the first message includes the authentication algorithm program. The MNO-SD may determine, based on authentication algorithm program tag (tag) information carried in the NAA authentication information update message, whether the NAA authentication information update message carries the authentication algorithm program.

S905. The ISD-R adds the authentication algorithm program to an algorithm library of a telecom framework.

S906. The ISD-R sends an authentication algorithm program adding completion message to the MNO-SD.

S907. After receiving the NAA authentication algorithm adding completion message, the MNO-SD updates authentication information of a profile corresponding to the target identifier to the NAA authentication parameter update information based on the NAA authentication parameter update information.

S908. After an update of an NAA authentication parameter is completed, the MNO-SD sends a second message (for example, a notification) to the MNO server, where the second message includes profile update completion information. The second message is used to indicate that the update of the authentication information of the terminal has been completed. Optionally, the second message may be further used to instruct the MNO server to send a third message to the authentication management server, so that the MNO server sends the third message to the authentication management server after determining that the authentication information of the terminal is updated.

The second message includes the profile update completion information, an authentication algorithm identifier, and a profile identifier. Alternatively, the second message includes a matching identifier (matchingID). The matching identifier is used to identify an event that the authentication information corresponding to the target identifier is updated. The MNO server may determine the target identifier and the authentication algorithm identifier based on the matching identifier, where the target identifier may be the profile identifier.

In addition, the second message may alternatively include only the profile update completion information and a profile identifier.

S909. After receiving the second message sent by the MNO-SD, the MNO server sends the third message to the HSS, where the third message is used to instruct the HSS to update authentication information corresponding to the profile identifier.

The third message may carry the authentication algorithm ID and an ICCID. Optionally, the ICCID may alternatively be replaced by a temporary mobile subscriber identity (Temporary Mobile Subscriber Identity, TMSI). Optionally, the third message may alternatively include an authentication information update identifier.

In addition, the third message may alternatively include only an ICCID.

S910. The authentication management server updates authentication information of a profile corresponding to the ICCID based on the received third message, for example, associates an IMSI corresponding to the ICCID (or the TMSI) with the authentication algorithm ID, and sends an acknowledgment message to the MNO-SD by using the MNO server. The MNO-SD sends an NAA authentication parameter update completion message to the ISD-R.

S911. The ISD-R sends a refresh command to the baseband processor.

S912. The baseband processor sends a terminal response (terminal response) or a reset (RESET) command to the ISD-R.

S913. The baseband processor uses updated authentication information of the profile to attach to the network.

A purpose of steps S911 to S913 is to use the updated authentication information of the profile for network re-attachment after the baseband processor performs detachment. The eUICC may further re-enable the profile with the authentication information updated. Specifically, the following steps may be performed for implementation.

S914. The ISD-R sends a refresh command to the baseband processor.

S915. The baseband sends a terminal response or a reset command to the ISD-R.

S916. The ISD-R disables the profile with the authentication information updated.

S917. The ISD-R enables the profile with the authentication information updated.

S918. The ISD-R sends an acknowledgment message to the LPA.

S919. The LPA sends a notification message to the baseband processor, to notify that the profile with the authentication information updated has been enabled.

S920. The baseband processor loads data in the profile with the authentication information updated, and uses the updated authentication information for network attachment.

According to this embodiment of the present invention, the MNO server can update the authentication information over an interface between the MNO server and the eUICC, to improve communication security. Further, the authentication information can be synchronized between the authentication management server and the eUICC, and signaling overheads are low. In this way, the eUICC and the authentication management server can correctly perform bidirectional authentication after the update is completed. Further, the authentication information can be synchronized between the authentication management server and the eUICC, and more convenience is brought to the remote server. In this way, the eUICC and the authentication management server can correctly perform bidirectional authentication after the update is completed. Moreover, a network authentication algorithm can be updated, so that network communication is more secure. In addition, updating authentication information of a profile in an enabled state means updating authentication information in a network communication process, and communication security is improved.

Figure 10:
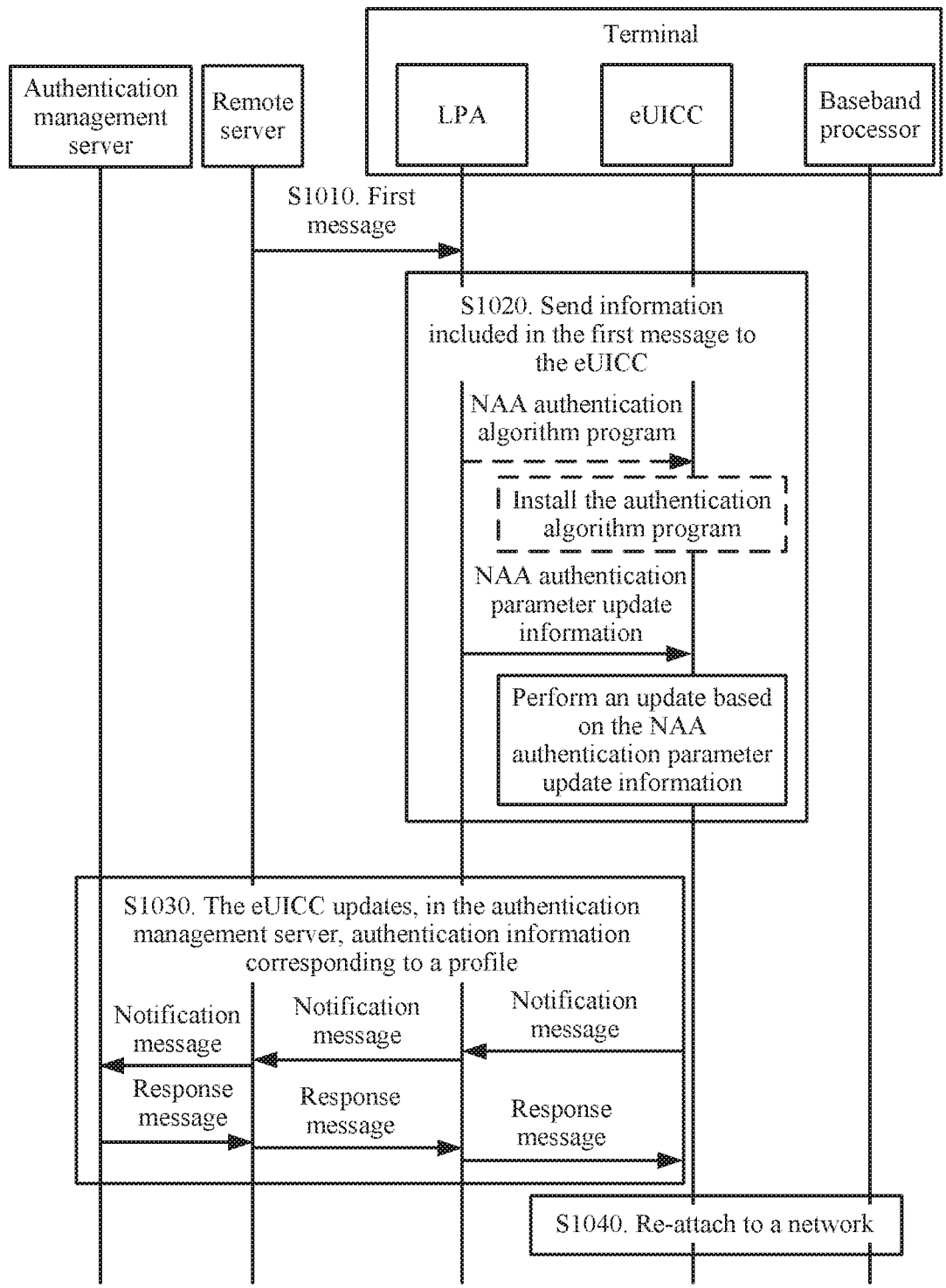
FIG. 10 is a signaling interworking diagram of yet another method for updating network access application authentication information according to an embodiment of the present invention.

FIG. 10 is a signaling interworking diagram of another method for updating network access application authentication information according to an embodiment of the present invention. As shown in FIG. 10, a remote server may communicate with an eUICC by using an LPA module on a terminal. The method specifically includes the following steps.

S1010. The remote server sends a first message to the LPA. The first message includes NAA authentication parameter update information and a target identifier. The target identifier may include an ICCID or an ISD-P identifier (for example, an ISD-P AID).

In another optional implementation, the NAA authentication update message may further include an authentication algorithm program.

The remote server may include one or more of an SM-DP+ server, an MNO server, a PCMP, or the like.

S1020. The LPA sends information included in the first message to the eUICC, so that the eUICC updates authentication information based on the information included in the NAA authentication update message.

Specifically, if the NAA authentication update message includes an authentication algorithm program, the LPA first sends a second message to the eUICC, where the second message includes the authentication algorithm program, so that the eUICC adds the authentication algorithm program. The LPA continues to send a third message to the eUICC, where the third message includes the NAA authentication parameter update information. After receiving the third message, the eUICC updates authentication information of a profile corresponding to the target identifier based on the NAA authentication parameter update information.

If the NAA authentication update message includes no authentication algorithm program, the LPA sends the NAA authentication parameter update information to the eUICC, and the eUICC performs an update based on the received NAA authentication parameter update information.

S1030. The eUICC sends a notification message to the authentication management server, so that the authentication management server associates the profile with an authentication algorithm.

Specifically, the eUICC sends a first notification message to the LPA, where the first notification message includes profile update completion information, and the first notification message is used to indicate to the LPA that the update of the authentication information has been completed. In addition, the first notification message may further include an authentication algorithm identifier and a profile identifier, and the first notification message is further used to instruct the LPA to send a notification message to the authentication management server, so that the authentication management server associates the authentication algorithm identifier with the profile identifier.

The LPA generates a second notification message after receiving the first notification message, and sends the second notification message to the remote server. The second notification message includes the profile update completion information, and the second notification message is used to indicate that the update of the authentication information corresponding to the profile identifier has been completed. The second notification message is further used to instruct the remote server to send a notification message to the authentication management server, so that the authentication management server associates the authentication algorithm identifier with the profile identifier. Optionally, the second notification message may include the authentication algorithm identifier and the profile identifier. The authentication algorithm identifier and the profile identifier may be included in an authentication information update completion result message.

In addition, the second notification message includes a matching identifier (matchingID). The matching identifier is used to identify an event that the authentication information corresponding to the target identifier is updated. The MNO server may determine the target identifier and the authentication algorithm identifier based on the matching identifier, where the target identifier may be the profile identifier.

The remote server generates a third notification message after receiving the second notification message, and sends the third notification message to the authentication management server. The third notification message includes the authentication algorithm identifier and the profile identifier, and the third notification message is used to instruct the authentication management server to associate the authentication algorithm identifier with the profile identifier. Optionally, the third notification message may further include result information used to indicate that the NAA authentication information is updated.

The authentication management server sends a first response message to the remote server. The first response message is used to acknowledge that the profile identifier has been associated with the authentication algorithm identifier on an authentication management server side. The first response message may be further used to instruct the remote server to send a response message to the eUICC, to instruct the eUICC to access a network based on updated authentication information. Optionally, the first response message may include the profile identifier and the authentication algorithm identifier.

The remote server sends a second response message to the LPA after receiving the first response message. The second response message includes the profile identifier and the authentication algorithm identifier, and the second response message is used to acknowledge that the profile identifier has been associated with the authentication algorithm identifier on the authentication management server side. The second response message may be further used to instruct the LPA to send a response message to the eUICC, to instruct the eUICC to access the network based on the updated authentication information. The second response message may alternatively be sent after the remote server receives the second notification message, or be sent after the remote server sends the third notification message. Optionally, the second response message may include the profile identifier and the authentication algorithm identifier.

The LPA sends a third response message to the eUICC after receiving the second response message. The third response message is used to acknowledge that the profile identifier has been associated with the authentication algorithm identifier on the authentication management server side. The third response message may be further used to instruct the eUICC to access the network based on the updated authentication information. The third response message may alternatively be sent after the LPA receives the first notification message, or be sent after the LPA sends the second notification message. Optionally, the third response message may include the profile identifier and the authentication algorithm identifier.

S1040. Re-attach to the network based on the updated authentication information of the profile.

Specifically, the eUICC sends a notification message to a baseband processor, where the notification message is used to instruct to access the network based on an updated parameter of the profile. Further, when the profile with the authentication information updated is in an enabled state, the eUICC may determine to send the notification message to the baseband processor. The baseband processor sends a response message to the eUICC, so that the eUICC re-enables the enabled profile, and the baseband processor attaches to the network based on the updated authentication information of the profile. Re-attaching to the network may be equivalent to accessing the network.

In addition, the profile may further be re-enabled by using the LPA. Specifically, after the LPA determines that the authentication update is completed, the LPA sends a disabling command to the eUICC; the eUICC disables the profile, and sends an acknowledgment message to the LPA; after receiving the acknowledgment, to the disabling command, fed back by the eUICC, the LPA sends an enabling command to the eUICC; and the eUICC enables the profile.

According to this embodiment of this application, the remote server can be used to update the authentication information for bidirectional authentication in a network attachment process, to improve communication security. Further, the authentication information can be synchronized between the authentication management server and the eUICC, and signaling overheads are low. In this way, the eUICC and the authentication management server can correctly perform bidirectional authentication after the update is completed. Further, the authentication information can be synchronized between the authentication management server and the eUICC, and more convenience is brought to the remote server. In this way, the eUICC and the authentication management server can correctly perform bidirectional authentication after the update is completed. Moreover, a network authentication algorithm can be updated, so that network communication is more secure. In addition, updating authentication information of a profile in an enabled state means updating authentication information in a network communication process, and communication security is improved.

FIG. 11 to FIG. 14 are signaling interworking diagrams of yet another method for updating network access application authentication information according to an embodiment of the present invention. As shown in FIG. 11 to FIG. 14, a remote server includes an SM-DP+ server and an SM-DS. The method specifically includes the following steps.

Figure 11:
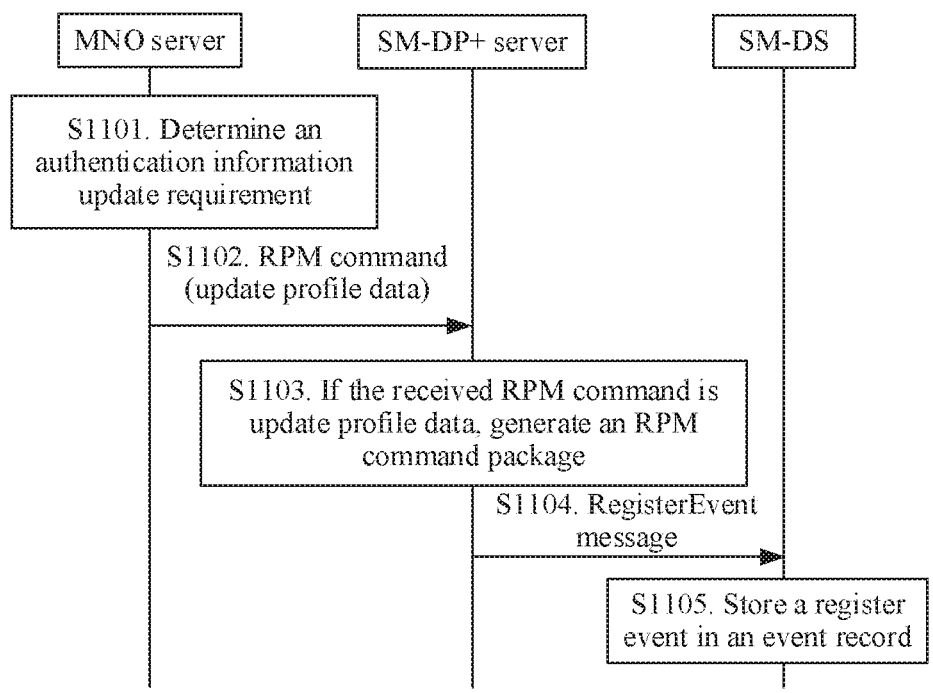
FIG. 11 is a signaling interworking diagram of yet another method for updating network access application authentication information according to an embodiment of the present invention.

As shown in FIG. 11, an MNO server needs to register an event about an authentication information update with the SM-DS. Specifically, the following steps S1101 to S1105 are included.

S1101. The MNO server determines an authentication information update requirement.

The authentication information update requirement may include an NAA authentication parameter update and an authentication algorithm update. The MNO server may generate NAA authentication parameter update information. Optionally, the MNO server may further generate an authentication algorithm program. For example, the MNO server may generate authentication algorithm programs of a plurality of versions for different card manufacturer hardware versions, operating system versions, and UICC capabilities, and may further create an authentication algorithm program list. The list includes NAA authentication algorithm program version identifiers of different versions, corresponding card manufacturer identifiers, card manufacturer hardware versions, operating system versions. UICC capabilities, and the like. The MNO server may initiate an NAA authentication information update every time a new authentication algorithm program is generated or at a specified time interval.

When NAA authentication information needs to be updated, the MNO server needs to send the NAA authentication parameter update information to the SM-DP+ server, so that the SM-DP+ server sends the NAA authentication parameter update information to a terminal after performing processing such as encryption. Optionally, the MNO server may send the NAA authentication parameter update information jointly with the authentication algorithm program to the SM-DP+ server.

The MNO server needs to send the NAA authentication parameter update information (or the NAA authentication parameter update information and the authentication algorithm program) to the SM-DP+ server, so that the SM-DP+ server sends the NAA authentication parameter update information (or the NAA authentication parameter update information and the authentication algorithm program) to the terminal after performing processing such as encryption. Specifically, steps S902 to S924 may be used for implementation.

S1102. The MNO server sends an RPM command (order) to the SM-DP+ server, where the command includes an EID, the NAA authentication parameter update information (or the NAA authentication parameter update information and the authentication algorithm program), and an ISD-P AID (or an ICCID). A value of an operation type (operation type) in the command is update profile data (update profile data). In addition, the RPM command further includes an SM-DS address. Optionally, the RPM command may alternatively include a matching identifier (MatchingID). The EID is used to indicate an eUICC that is to update authentication information. The ISD-P AID or the ICCID is used to indicate a profile, corresponding to the EID, whose authentication information is to be updated. The value of the operation type of the RPM command is update profile data (update profile data), indicating that the RPM command is used to update or upgrade profile content.

S1103. If determining that an operator byte of the RPM command is update profile data, the SM-DP+ server generates an RPM protection key (protection key), and generates an RPM command package (RPM command package), where the RPM command package is encrypted by using the RPM protection key, and the RPM command includes the EID, the NAA authentication parameter update information (or the NAA authentication parameter update information and the authentication algorithm program), and the ISD-P application identifier (or the ICCID).

The SM-DP+ server sends the encrypted NAA authentication parameter update information (or the encrypted NAA authentication parameter update information and authentication algorithm program) to the terminal. The SM-DS may be used to send the encrypted NAA authentication parameter update information (or the encrypted NAA authentication parameter update information and authentication algorithm program) to an LPA, that is, send the RPM command package to the LPA. In addition, a function of the SM-DS is to notify the LPA that the SM-DP+ server has information to be sent to the eUICC. Specifically, steps S904 to S915 may be used for implementation.

S1104. The SM-DP+ server sends a RegisterEvent (RegisterEvent) message to the SM-DS, where the RegisterEvent message includes the EID, an SM-DP+ server address, and EventID. The RegisterEvent message is used to indicate that the SM-DP+ server has information to be sent to the eUICC.

S1105. The SM-DS stores the event in an event record (Event Record). The event includes the EID, the SM-DP+ server address, and EventID that can be determined based on the RegisterEvent message.

Figure 12:
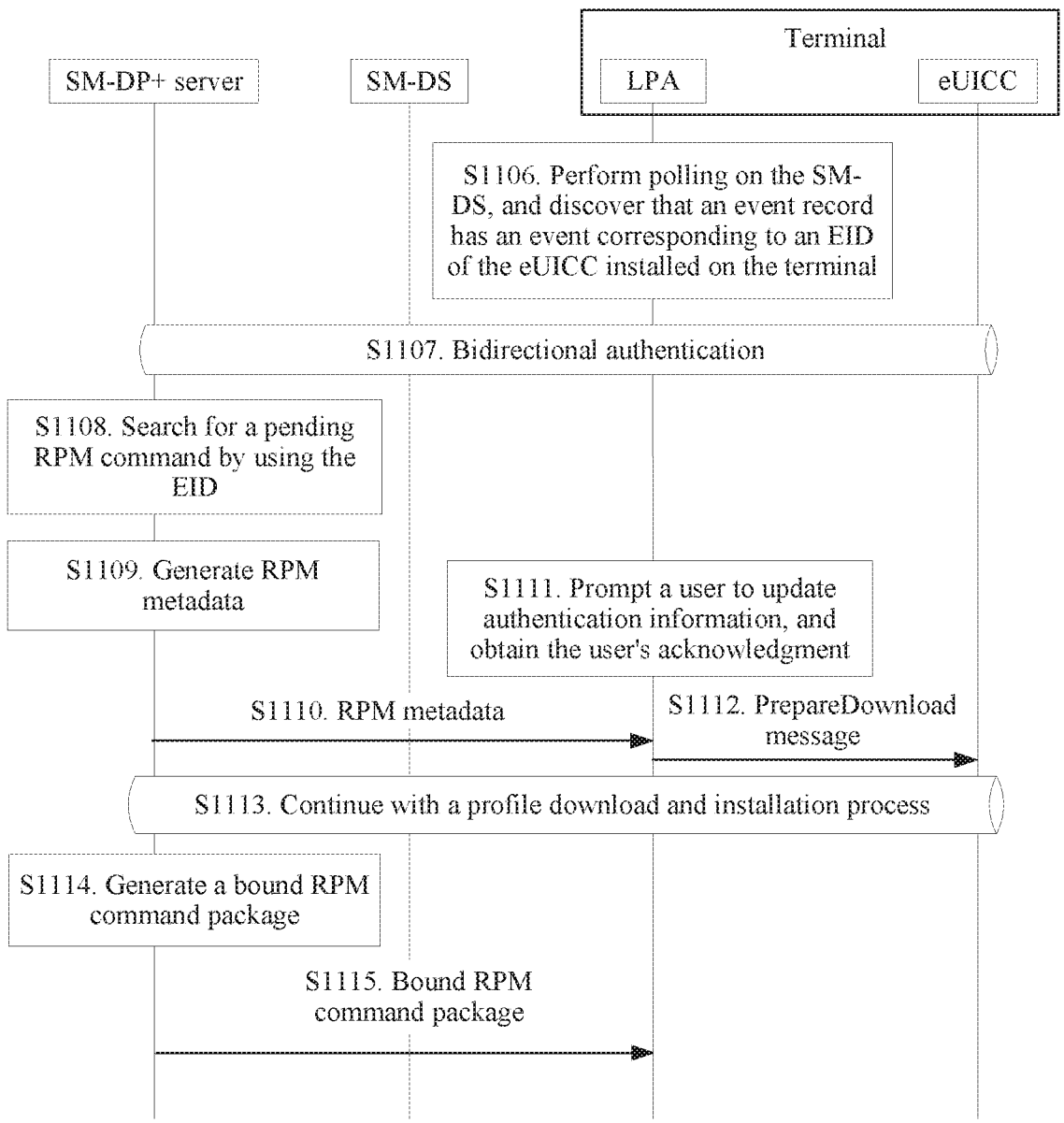
FIG. 12 is a signaling interworking diagram of yet another method for updating network access application authentication information according to an embodiment of the present invention.

As shown in FIG. 12, by querying the event record in the SM-DS, the terminal discovers an event corresponding to the terminal and obtains information corresponding to the event. Specifically, the following steps S906 to S915 may be included.

S1106. The LPA performs polling on the SM-DS, and discovers that the event record has an event corresponding to the EID of the eUICC installed on the terminal.

S1107. The eUICC completes bidirectional authentication with the SM-DP+ server. Because the event record stores the EID, the SM-DP+ server address, and EventID, the terminal may obtain the information corresponding to the event from an SM-DP+ server pointed by the SM-DP+ server address. The eUICC first needs to perform bidirectional authentication with the SM-DP+ server. In a bidirectional authentication process, the eUICC sends the EID to the SM-DP+ server.

S1108. The SM-DP+ server searches for a pending RPM command (pending RPM command) by using the EID.

Before sending an RPM command package corresponding to the EID to the eUICC, the SM-DP+ server may first send a request message to the eUICC, to instruct the eUICC to update or upgrade the profile. Specifically, steps S1109 to S1113 may be used for implementation.

S1109. The SM-DP+ server generates RPM metadata (metadata) based on the pending RPM command, where the RPM metadata includes the ISD-P AID (or the ICCID) and the operation type with the value of update profile data.

The SM-DP+ server generates to-be-signed data 3 (smdpSigned3), which includes a transaction (Transaction) ID.

The SM-DP+ server generates a to-be-signed-data signature value 3 (smdpsignature3) by using smdpSigned3 and an eUICC signature file 1 (euiccSignature1).

S1110. The SM-DP+ server sends the RPM metadata to the LPA. Specifically, the SM-DP+ server sends a message carrying TransactionID, the RPM metadata, smdpSigned3, smdpSignature3, and CERT.DPpb.ECDSA to the LPA. The RPM metadata may instruct the LPA to update the profile corresponding to the ISD-P AID (the ICCID). Alternatively, the RPM metadata may indicate that the information on the SM-DP+ server to be sent to the eUICC is used to update profile content.

S1111. The LPA prompts a user to update the profile content, and obtains the user's acknowledgment. The process ends if the user does not acknowledge or disagrees with the update of the profile content.

In addition, the LPA receives the RPM metadata (first metadata) sent by the remote server, where the RPM metadata includes a profile content update identifier, and the profile content update identifier is used to indicate that the LPA does not need to obtain a user acknowledgment.

Steps S1109 to S1111 are optional steps.

S1112. The LPA sends a PrepareDownload (PrepareDownload) message to the eUICC, where the PrepareDownload message includes smdpSigned3, smdpSignature3, and CERT.DPpb.ECDSA.

S1113. Continue with a profile download and installation (download and installation) process.

S1114. The SM-DP+ server generates a bound RPM command package (bound RPM command package).

Specifically, the SM-DP+ server generates a one-time key pair (that is, a one-time ECKA key pair), where the one-time key pair includes otPK.DP.ECKA and otSK.DP.ECKA; and generates a session key (session key), and uses the session key to encrypt the RPM command package and separately generates the bound RPM command package.

S1115. The SM-DP+ server sends the bound RPM command package to the LPA. Specifically, the SM-DP+ server sends a message carrying the transaction ID and the bound RPM command package to the LPA. Metadata in the RPM command package includes the ICCID (or the ISD-P AID). In addition, the metadata in the RPM command package may further include an algorithm ID.

Figure 13:
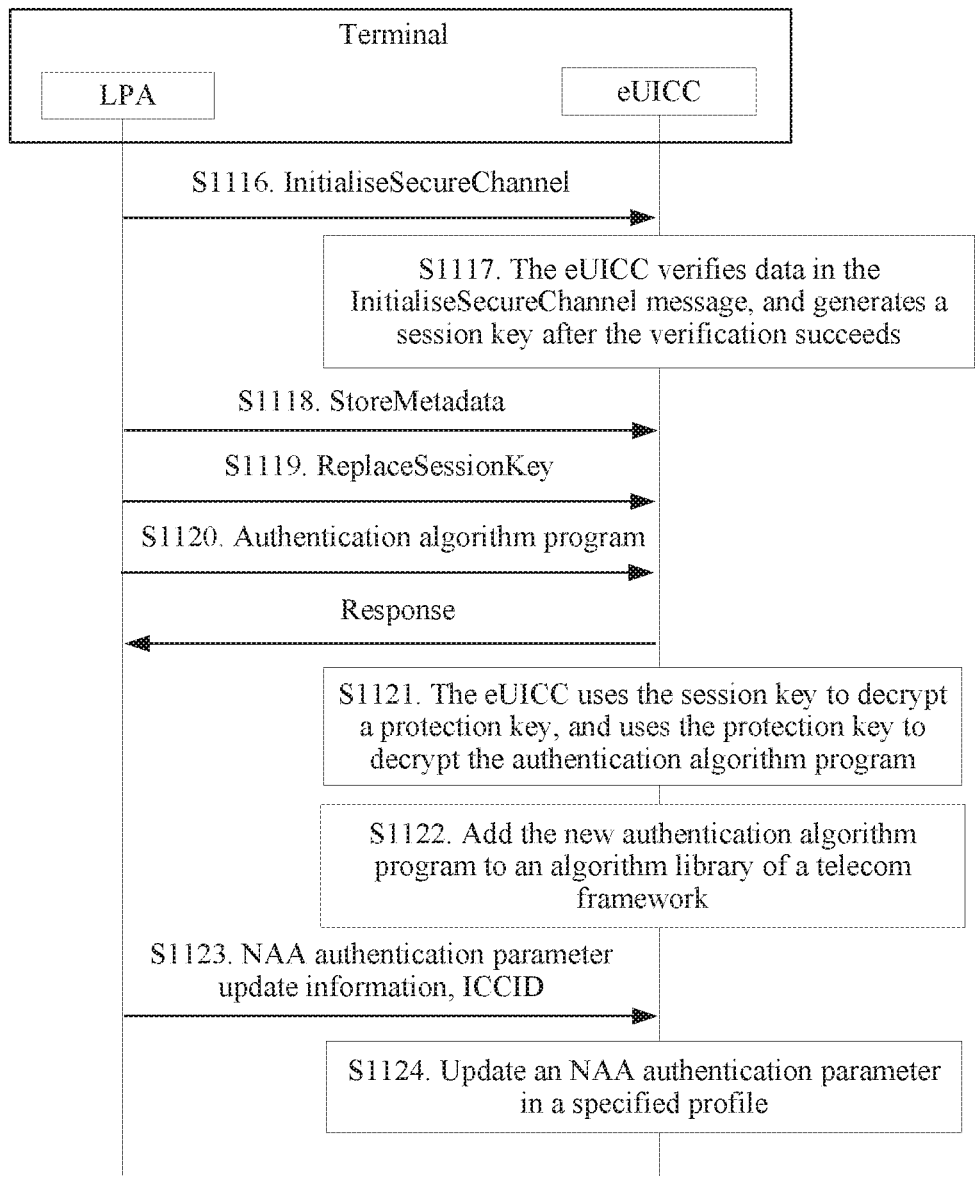
FIG. 13 is a signaling interworking diagram of yet another method for updating network access application authentication information according to an embodiment of the present invention.

As shown in FIG. 13, the LPA needs to send the received NAA authentication parameter update information and authentication algorithm program to the eUICC. Specifically, the following steps S1116 to S1124 are included.

S1116. The LPA sends a plurality of load bound packages (load bound package) to the eUICC, where the plurality of load bound packages include an InitialiseSecureChannel (InitialiseSecureChannel) message.

S1117. The eUICC verifies data in the InitialiseSecureChannel message, and generates a session key (session key) after the verification succeeds.

S1118. The LPA sends a plurality of load bound packages (load bound package) to the eUICC, where the plurality of load bound packages include StoreMetadata (StoreMetadata).

S1119. The LPA sends a plurality of load bound packages (load bound package) to the eUICC, where the plurality of load bound packages include ReplaceSessionKey (ReplaceSessionKey).

S1120. The LPA sends a plurality of load bound packages (load bound package) to the eUICC, where the plurality of load bound packages include an authentication algorithm RPM command. The LPA sends the authentication algorithm program to the eUICC by using a download RPM command or a load profile element (LoadprofileElement). After receiving the authentication algorithm program, the eUICC returns a response.

S1121. The eUICC uses the session key to decrypt the protection key (RPM protection key), and uses the protection key to decrypt the authentication algorithm program.

S1122. The eUICC adds the new authentication algorithm program to the eUICC.

S1123. The LPA sends the NAA authentication parameter update information and the ISD-P AID to the eUICC by using a download RPM command. The download RPM command may be replaced by a load profile element, and the ISD-P AID may be replaced by the ICCID.

S1124. The eUICC updates, based on the NAA authentication parameter update information, an NAA authentication parameter in the profile specified by the ISD-P AID (or the ICCID).

Figure 14:
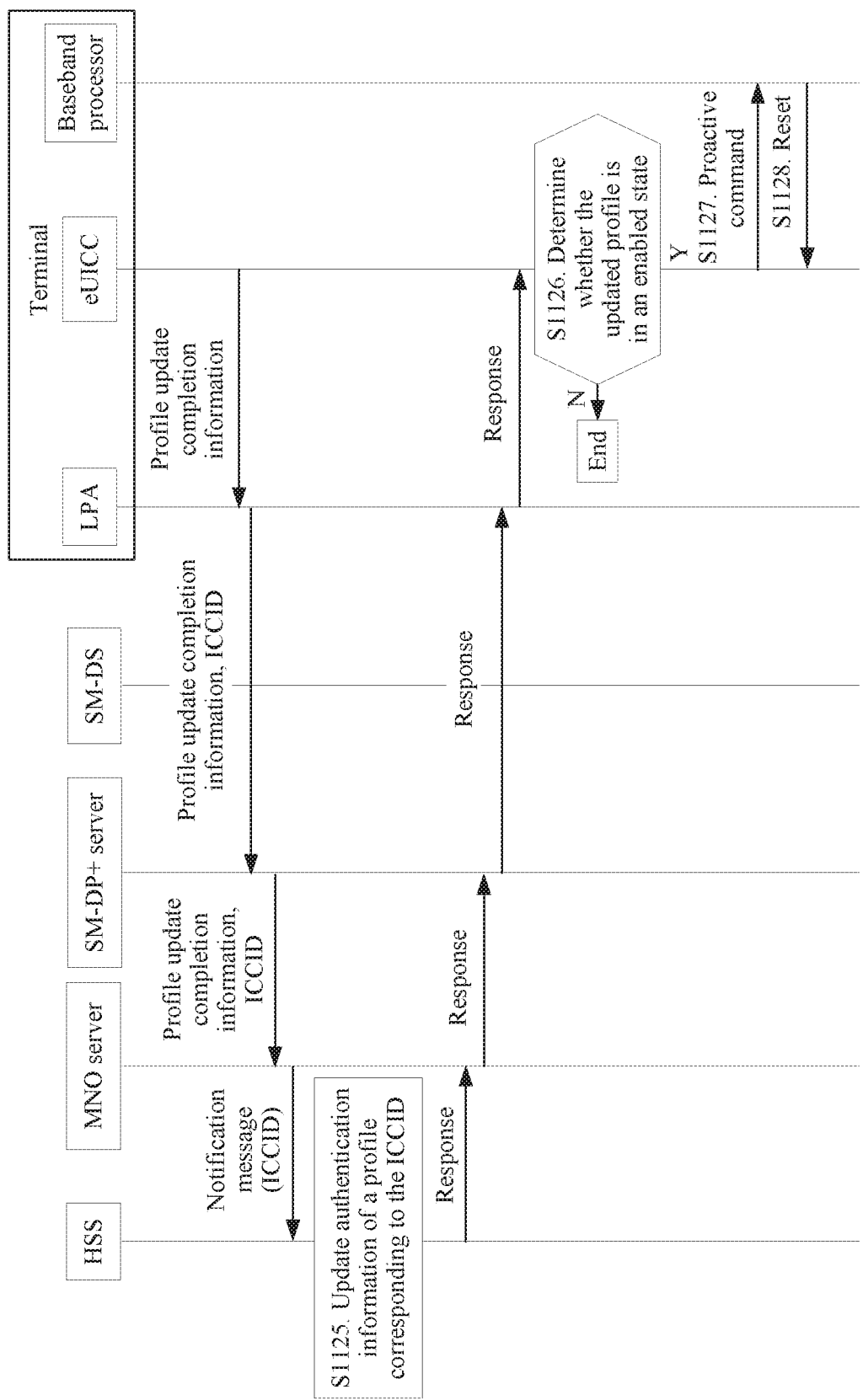
FIG. 14 is a signaling interworking diagram of yet another method for updating network access application authentication information according to an embodiment of the present invention.

As shown in FIG. 14, when the authentication information in the eUICC is updated, the authentication information further needs to be synchronized between an authentication management server and a baseband processor. Specifically, steps S1125 to SS1128 are included.

S1125. After the update of the NAA authentication parameter is completed, the LPA sends a notification message to an HSS by using the SM-DP+ server and the MNO server. The HSS updates the authentication information corresponding to the profile. If only the NAA authentication parameter is updated, the HSS updates the authentication information of the profile to the NAA authentication parameter update information. If both the NAA authentication parameter and an authentication algorithm are updated, the HSS associates the profile, the authentication algorithm, and the NAA authentication parameter update information with one another.

Optionally, the LPA may send profile update completion information to the SM-DP+ server. The SM-DP+ server sends the profile update completion information to the MNO server. The MNO server determines an ICCID (or a TMSI) based on the profile update completion information, and sends a notification message carrying the ICCID to the HSS. The notification message carrying the ICCID may further carry NAA authentication algorithm update result information or an authentication algorithm identifier or an authentication algorithm execution file and the NAA authentication parameter update information. The HSS updates authentication information corresponding to the ICCID (or the TMSI), and sends an acknowledgment message to the eUICC by using the MNO server and the SM-DP+ server. Specifically, the HSS associates an IMSI corresponding to the ICCID with an authentication algorithm of the corresponding authentication algorithm ID and the NAA authentication parameter update information, or the HSS updates the authentication information corresponding to the ICCID to the NAA authentication parameter update information.

Optionally, the LPA may send a notification message carrying a session identifier (TransactionID) to the SM-DP+ server. After receiving the notification message carrying TransactionID, the SM-DP+ server finds a corresponding matching identifier based on the session identifier (TransactionID), and sends a notification message carrying the matching identifier to the MNO server. The MNO server may determine, based on the matching identifier, an ICCID corresponding to the authentication update and updated content. The MNO server sends a notification message carrying the ICCID to the HSS, to notify that authentication information corresponding to the ICCID is updated. Optionally, the LPA sends a first notification to the SM-DP+ server, where the first notification carries the profile update completion information and the ICCID. The first notification may further include the authentication algorithm identifier.

The SM-DP+ server sends a second notification to the MNO server, where the second notification carries the profile update completion information and the ICCID. The second notification may further include the authentication algorithm identifier.

The MNO server sends a third notification to the HSS, where the third notification carries the NAA authentication algorithm update result information and the ICCID. The third notification may further include the authentication algorithm identifier.

S1126. After receiving the acknowledgment message, the eUICC determines whether the profile with the authentication information updated is a currently enabled profile.

S1127. If the profile with the authentication information updated is the currently enabled profile, the eUICC sends a refresh command to the baseband processor of the terminal.

S1128. The baseband processor sends a reset command to the eUICC, and the eUICC re-enables the profile with the authentication information updated.

In addition, the baseband processor may further send a terminal response message to the eUICC, so that baseband processor reloads the updated authentication information of the profile to access the network.

According to this embodiment of this application, the MNO server, the SM-DP+ server, and the SM-DS server update the authentication information of the profile. The HSS can synchronously update the authentication information of the profile by using the MNO server and the SM-DP+ server. By re-enabling the profile, the baseband processor can use the updated authentication information of the profile to access the network.

FIG. 15 to FIG. 18 are signaling interworking diagrams of yet another method for updating network access application authentication information according to an embodiment of the present invention. As shown in FIG. 15 to FIG. 18, a remote server includes an SM-DP+ server and an SM-DS. The method specifically includes the following steps.

Figure 15:
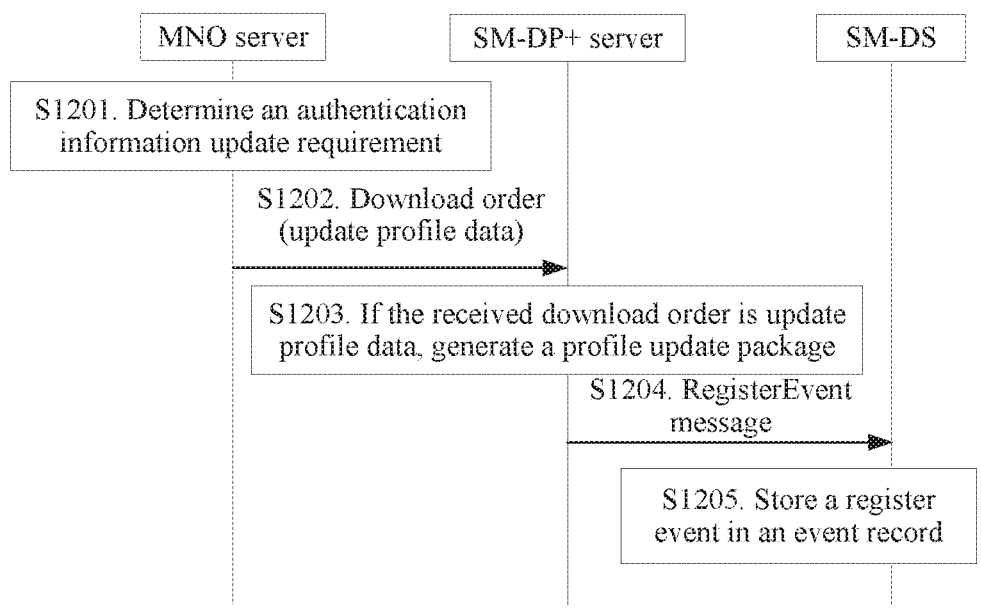
FIG. 15 is a signaling interworking diagram of yet another method for updating network access application authentication information according to an embodiment of the present invention.

As shown in FIG. 15, an MNO server needs to register an event about an authentication information update with the SM-DS. Specifically, the following steps S1201 to S1205 are included.

S1201. The MNO server determines an authentication information update requirement.

The authentication information update requirement may include an NAA authentication parameter update and an authentication algorithm update. The MNO server may generate NAA authentication parameter update information. Optionally, the MNO server may further generate an authentication algorithm program. For example, the MNO server may generate authentication algorithm programs of a plurality of versions for different card manufacturer hardware versions, operating system versions, and UICC capabilities, and may further create an authentication algorithm program list. The list includes NAA authentication algorithm program version identifiers of different versions, corresponding card manufacturer identifiers, card manufacturer hardware versions, operating system versions, UICC capabilities, and the like. The MNO server may initiate an NAA authentication information update every time a new authentication algorithm program is generated or at a specified time interval.

When NAA authentication information needs to be updated, the MNO server needs to send the NAA authentication parameter update information to the SM-DP+ server, so that the SM-DP+ server sends the NAA authentication parameter update information to a terminal after performing processing such as encryption. Optionally, the MNO server may send the NAA authentication parameter update information jointly with the authentication algorithm program to the SM-DP+ server.

The following manner may be specifically included, in which the MNO server needs to send NAA authentication update basic information to the SM-DP+ server, so that the SM-DP+ server performs processing such as encryption.

S1202. The MNO server sends a download order (DownloadOrder) to the SM-DP+ server, where the order carries an EID, the NAA authentication parameter update information, and an ISD-P AID or an ICCID. Optionally, the order may further carry the authentication algorithm program.

S1203. The SM-DP+ server generates a profile element (profile element, PE) including the NAA authentication update information. The SM-DP+ server uses the profile element to form an unprotected profile package (unprotected profile package). The SM-DP+ server generates a profile protection key (profile protection key), and uses the profile protection key to encrypt the unprotected profile package including the profile element, to form a protected partial profile package (protected partial profile package). A partial profile package may also be referred to as a profile update package.

Optionally, the SM-DP+ server may alternatively not generate the profile protection key (profile protection key).

The SM-DP+ server may send the encrypted NAA authentication update information to the terminal by using the SM-DS. Details are as follows.

S1204. The SM-DP+ server sends a RegisterEvent (RegisterEvent) message to the SM-DS, where the message includes the EID, an SM-DP+ server address, and EventID.

S1205. The SM-DS stores the event in an event record (Event Record).

Figure 16:
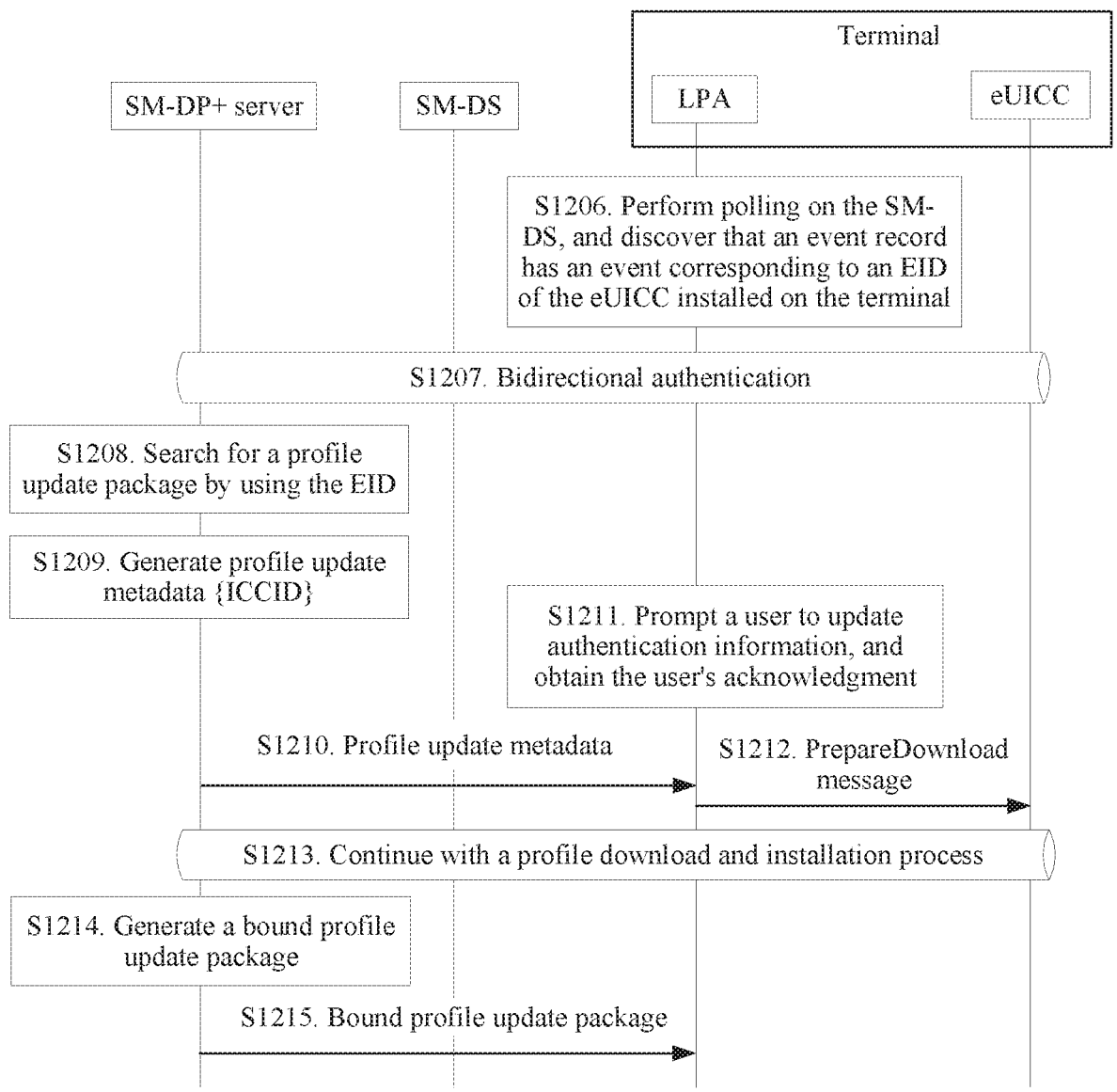
FIG. 16 is a signaling interworking diagram of yet another method for updating network access application authentication information according to an embodiment of the present invention.

As shown in FIG. 16, by querying the event record in the SM-DS, the terminal discovers an event corresponding to the terminal and obtains information corresponding to the event. Specifically, the following steps S1206 to S1215 may be included:

S1206. The LPA performs polling on the SM-DS, and discovers that the event record has an event corresponding to the EID of an eUICC installed on the terminal.

S1207. The eUICC completes bidirectional authentication with the SM-DP+ server.

S1208. The SM-DP+ server searches for a to-be-processed profile update package by using the EII), and determines a first profile update package corresponding to the EID.

S1209. The SM-DP+ server generates profile update package metadata based on the profile update package. The SM-DP+ server generates to-be-signed data 3 (smdpSigned3). Optionally, a StoreMetadata (StoreMetadata) part of the profile update package includes the ISD-P AID or the ICCID. Optionally, the SM-DP+ server may send, to the LPA, a message that carries StoreMetadata including a transaction (Transaction) ID and that carries a to-be-signed-data signature value 3 (smdpsignature3) generated by using smdpSigned3 and an eUICC signature file 1 (euiccSignature1). S1210. The SM-DP+ server sends the profile update package metadata to the LPA. Specifically, the SM-DP+ server sends TransactionID, the profile update package metadata, smdpSigned3, smdpSignature3, and CERT.DPpb.ECDSA to the LPA.

S1211. The LPA prompts a user to update the authentication information, and obtains the user's acknowledgment.

The LPA receives the profile update package metadata from the remote server. The profile update package metadata includes a profile content update identifier, and the profile content update identifier is used to indicate that the LPA does not need to obtain a user acknowledgment. Specifically, the profile content update identifier is used to indicate that the LPA does not need to obtain a user acknowledgment before obtaining a profile update package.

S1212. The LPA sends a PrepareDownload (PrepareDownload) message to the eUICC, where the PrepareDownload message includes smdpSigned3, smdpSignature3, and CERT.DPpb.ECDSA.

Steps S1209 to S1212 are optional steps. That is, a profile update package download process can be directly performed without a user acknowledgment.

S1213. Continue with a profile update package download and installation (download and installation) process.

S1214. The SM-DP+ server generates a bound profile update package. The bound profile update package may further include profile content (UpdateProfileContentRequest) update request information before a StoreMetadata part, to instruct the eUICC to update content of a profile corresponding to the target identifier. The bound profile update package successively includes StoreMetadata and the NAA authentication parameter update information after the profile content update request information. Optionally, the profile update package may alternatively not include StoreMetadata. The profile content update request information may include one SM-DP+ object ID object identifier (dpOid Object identifier), and the object identifier is used to indicate an SM-DP+ server that sends the first message. Optionally, the profile content update request information may further include a first identifier. The profile content update request information may be a profile content update indication. Optionally, the profile content update indication may also include the dpOid Object identifier and the first identifier. Optionally, in the second profile update package, StoreMetadata, the authentication algorithm program, and the NAA authentication parameter update information are successively located after the profile content update request information. The SM-DP+ server generates the to-be-signed data 3 (smdpSigned3) including the transaction (Transaction) ID, and generates the to-be-signed-data signature value 3 (smdpsignature3) by using smdpSigned3 and the eUICC signature file 1 (euiccSignature1).

Specifically, if the SM-DP+ server once generates a profile protection key, the SM-DP+ server generates a one-time key pair (namely, a one-time ECKA key pair), including otPK.DP.ECKA and otSK.DP.ECKA; and generates a session key (session key) after obtaining otPK.EUICC.ECKA sent by the eUICC, and uses the session key to encrypt the profile protection key and generates the bound profile update package.

If the SM-DP+ server does not generate a profile protection key before, the SM-DP+ server generates a one-time key pair (namely, a one-time ECKA key pair), including otPK.DP.ECKA and otSK.DP.ECKA; and generates a session key (session key) after obtaining otPK.EUICC.ECKA sent by the eUICC, and uses the session key to encrypt the NAA authentication parameter update information and generates the bound profile update package. Optionally, the bound profile update package may further include an authentication algorithm, and the SM-DP+ server uses the session key to encrypt the authentication algorithm.

S1215. The SM-DP+ server sends the bound profile update package to the LPA. Specifically, the SM-DP+ server sends a package including the transaction ID and the bound profile update package to the LPA. The bound profile update package includes StoreMetadata, and the StoreMetadata part includes the ICCID or the ISD-P AID. Optionally, if the bound profile update package includes the authentication algorithm, the StoreMetadata part in the package includes the ICCID and an authentication algorithm identifier or the ISD-P AID and the authentication algorithm identifier.

For example, as shown in FIG. 19, when only an NAA authentication parameter needs to be updated, a bound profile update package may include profile content update request information and NAA authentication parameter update information. Profile update data may not include StoreMetadata. The profile update package may alternatively be a bound profile update package. Optionally, the bound profile update package may include InitialiseSecureChannel, profile content update request information, StoreMetadata. and NAA authentication parameter update information. In addition, as shown in FIG. 20, a protection key may be further included. The profile content update request information is used to instruct the eUICC to update the content of the profile corresponding to the target identifier.

For another example, as shown in FIG. 21, when an NAA authentication parameter and an authentication algorithm need to be updated, a bound profile update package may include InitialiseSecureChannel, profile content and firmware update content request information, StoreMetadata, NAA authentication parameter update information, and an authentication algorithm identifier (or an authentication algorithm program). In addition, as shown in FIG. 22, a protection key may be further included. The profile content and firmware update request information is used to instruct the eUICC to update firmware and the content of the profile corresponding to the target identifier.

Figure 17:
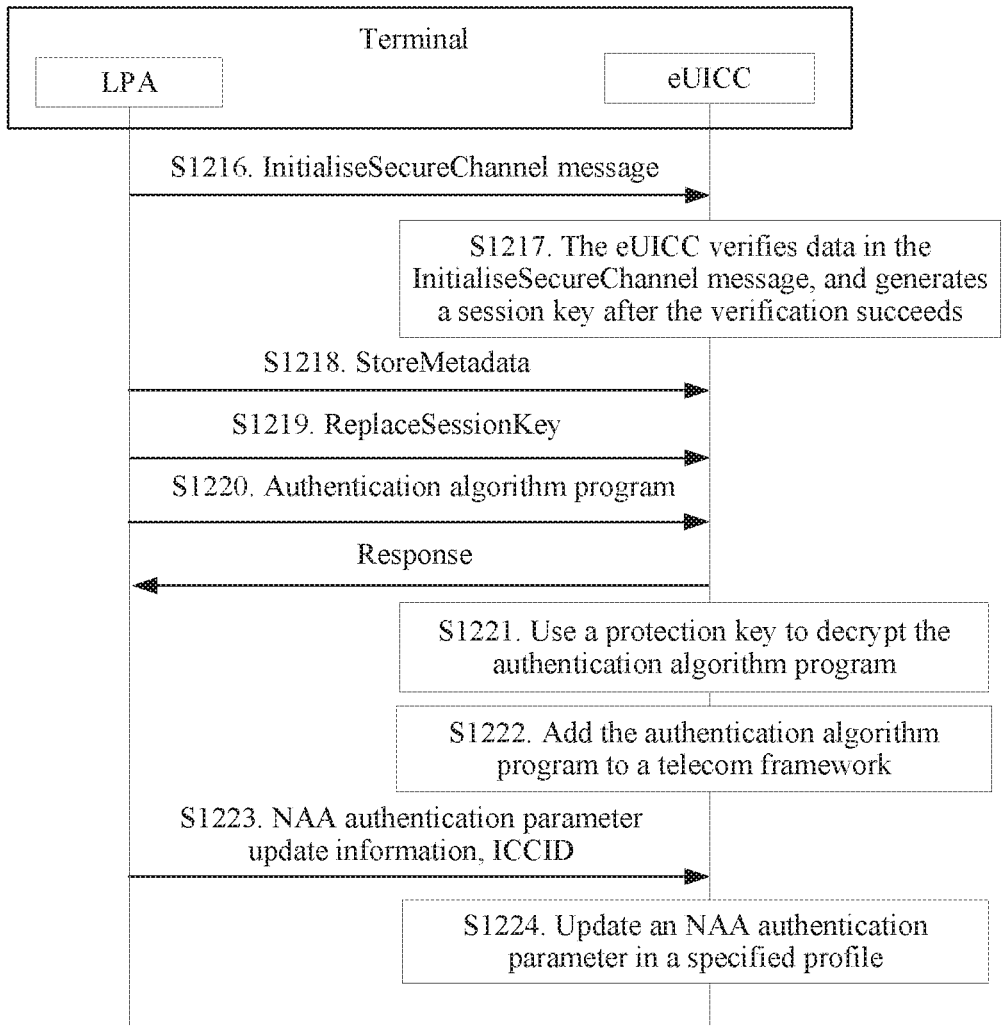
FIG. 17 is a signaling interworking diagram of yet another method for updating network access application authentication information according to an embodiment of the present invention.

As shown in FIG. 17, the LPA needs to send the received NAA authentication parameter update information and authentication algorithm program to the eUICC. Specifically, the following steps S1216 to S1224 are included.

S1216. The LPA sends a plurality of load bound packages (load bound package) to the eUICC, where the plurality of load bound packages include an InitialiseSecureChannel (InitialiseSecureChannel) message.

S1217. The eUICC verifies data in the InitialiseSecureChannel message, and generates a session key (session key) after the verification succeeds.

S1218. If the bound profile update package includes StoreMetadata, the LPA sends a plurality of load bound packages (load bound package) to the eUICC, where the plurality of load bound packages include StoreMetadata (StoreMetadata).

S1219. The LPA sends a plurality of load bound packages (load bound package) to the eUICC, where the plurality of load bound packages include ReplaceSessionKey (ReplaceSessionKey).

S1220. The LPA sends a plurality of load bound packages (load bound package) to the eUICC, where the plurality of load bound packages include a profile element of the authentication algorithm program. The LPA sends the authentication algorithm program to the eUICC by using a load profile element (LoadprofileElement). After receiving the authentication algorithm program, the eUICC returns a response.

S1221. If the plurality of load bound packages include a protection key, the eUICC uses the session key to decrypt the protection key, and uses the protection key to decrypt the authentication algorithm program.

S1222. The eUICC adds the new authentication algorithm program to the eUICC.

S1223. The LPA sends the NAA authentication parameter update information and the ISD-P AID to the eUICC by using a load profile element. The load profile element may be replaced by a download RPM command, and the ISD-P AID may be replaced by the ICCID.

S1224. The eUICC updates, based on the NAA authentication parameter update information, an NAA authentication parameter in the profile specified by the ISD-P AID (or the ICCID).

The LPA identifies, by using a tag of an encrypted data part, encrypted data including the authentication algorithm program and encrypted data including the NAA authentication parameter update information, and downloads the encrypted data including the authentication algorithm program and the encrypted data including the NAA authentication parameter update information to the eUICC by using a bound package. By identifying the tag, the LPA may alternatively first send the authentication algorithm program to the eUICC and then send the NAA authentication parameter update information to the eUICC. Optionally, by identifying the tag, the LPA may alternatively first send the NAA authentication parameter update information to the eUICC and then send the authentication algorithm program to the eUICC.

Figure 18:
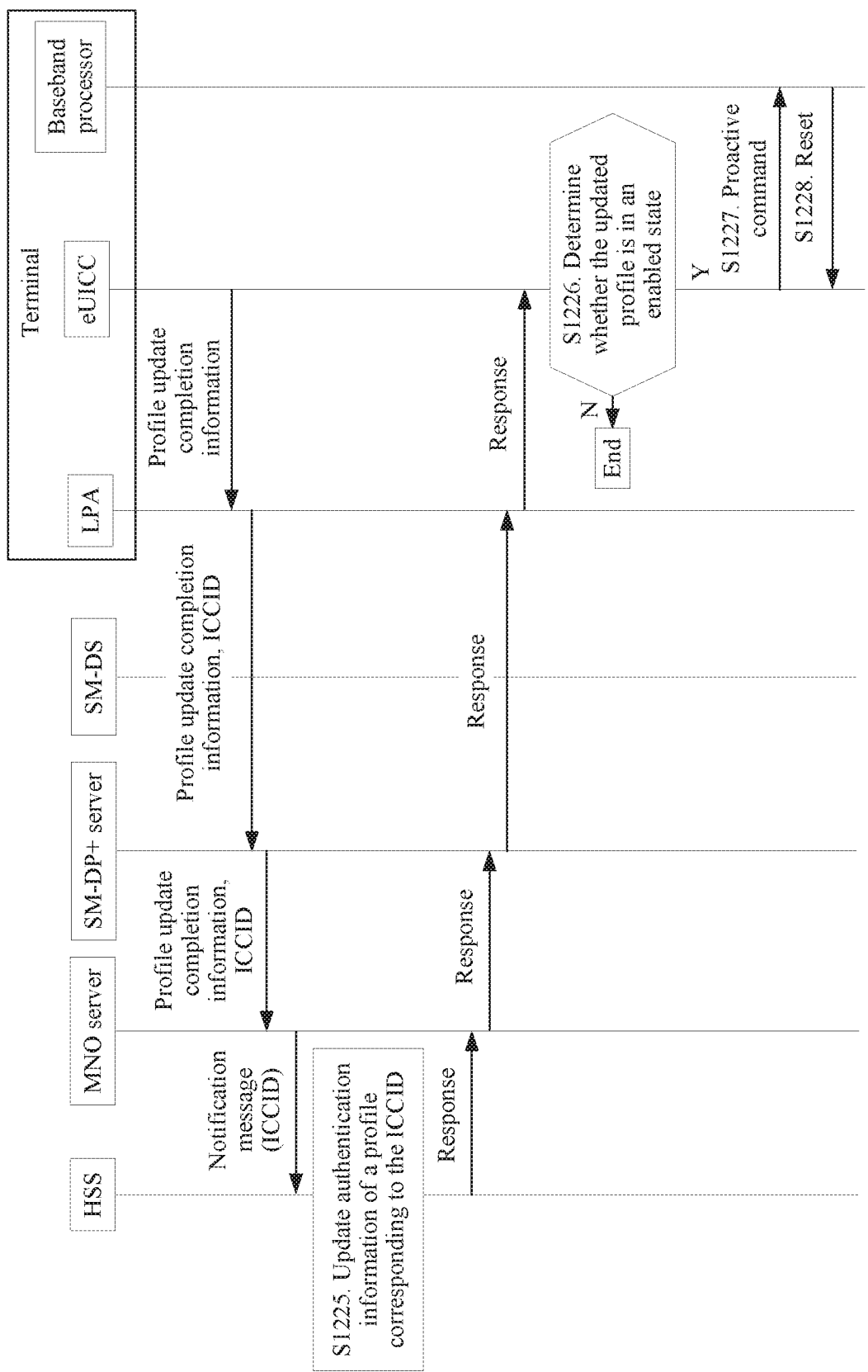
FIG. 18 is a signaling interworking diagram of yet another method for updating network access application authentication information according to an embodiment of the present invention.

As shown in FIG. 18, when the authentication information in the eUICC is updated, the authentication information further needs to be synchronized between an authentication management server and a baseband processor. Specifically, steps S925 to S928 are included.

S1225. After the update of the NAA authentication parameter is completed, the LPA sends a notification message to an HSS by using the SM-DP+ server and the MNO server. Optionally, the notification message may carry the authentication algorithm ID and the ICCID (or a TMSI), and the message may further carry NAA authentication algorithm update result information. The HSS associates an IMSI corresponding to the ICCID (or the TMSI) with an NAA authentication algorithm of the corresponding authentication algorithm ID based on the received message, and sends an acknowledgment message to the eUICC by using the MNO server and the SM-DP+ server.

S1226. After receiving the acknowledgment message, the eUICC determines whether the profile with the authentication information updated is a currently enabled profile.

S1227. If the profile with the authentication information updated is the currently enabled profile, the eUICC sends a refresh command to the baseband processor of the terminal.

S1228. The baseband processor sends a reset command to the eUICC, and the eUICC re-enables the profile with the authentication information updated. In addition, the baseband processor may further send a terminal response message to the eUICC, so that baseband processor reloads the updated authentication information of the profile to access the network.

Figure 23:
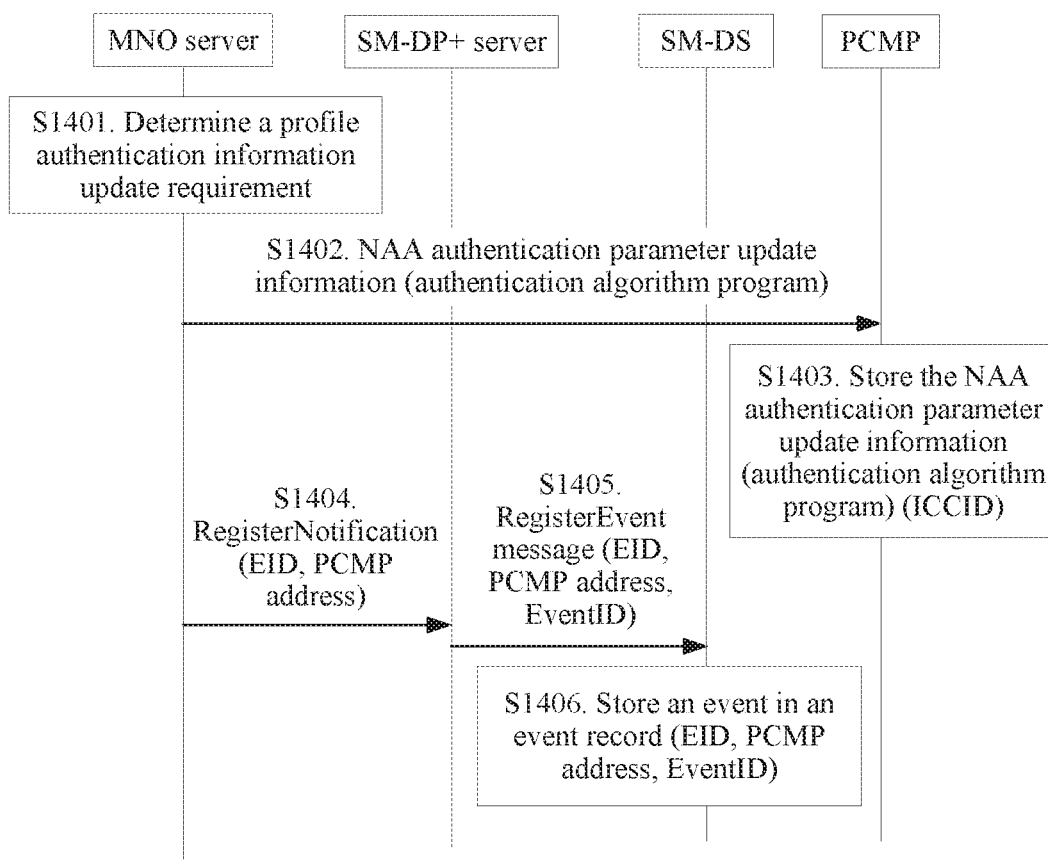
FIG. 23 is a signaling interworking diagram of yet another method for updating network access application authentication information according to an embodiment of the present invention.
Figure 24A:
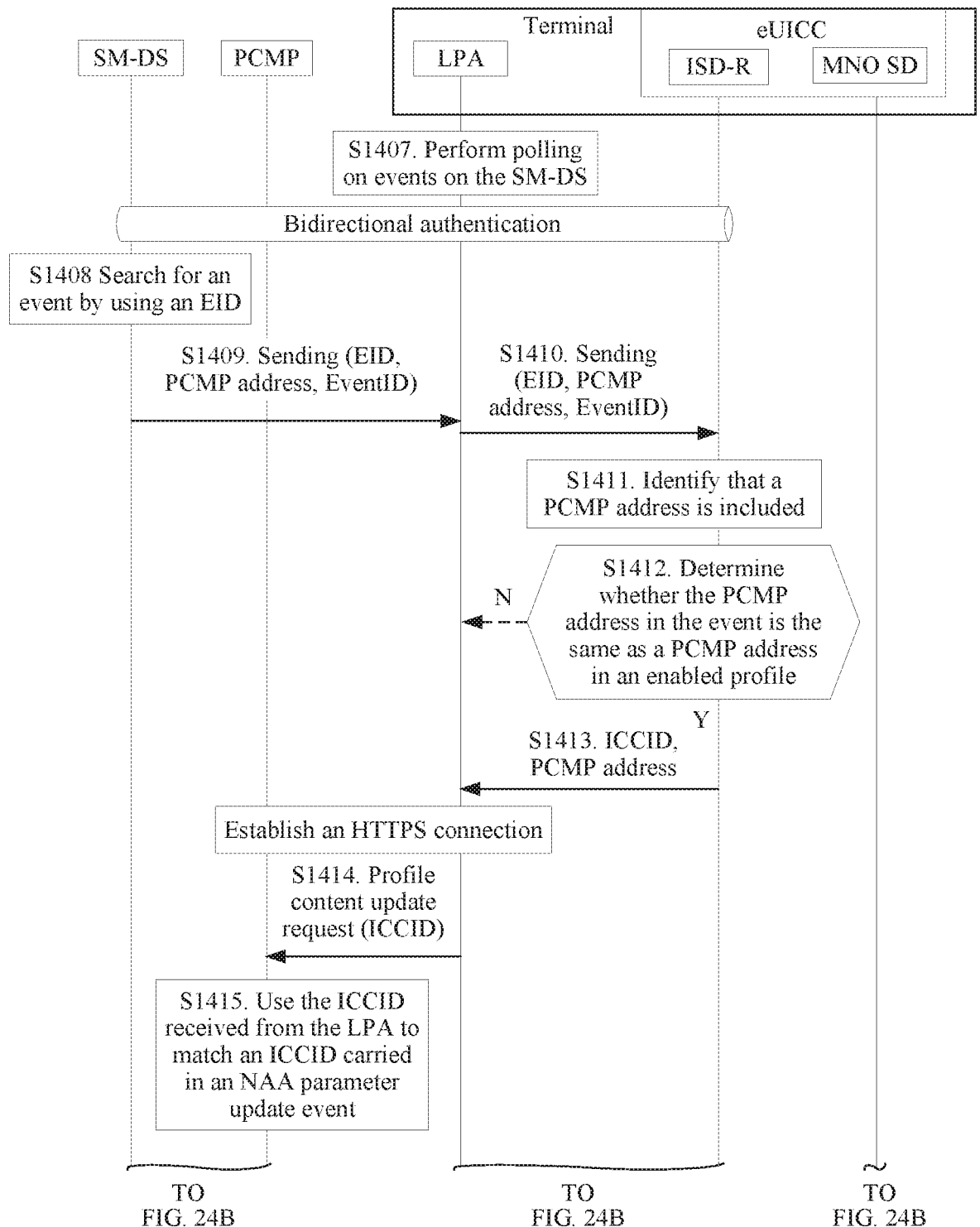
FIG. 24A and FIG. 24B are a signaling interworking diagram of yet another method for updating network access application authentication information according to an embodiment of the present invention.
Figure 24B:
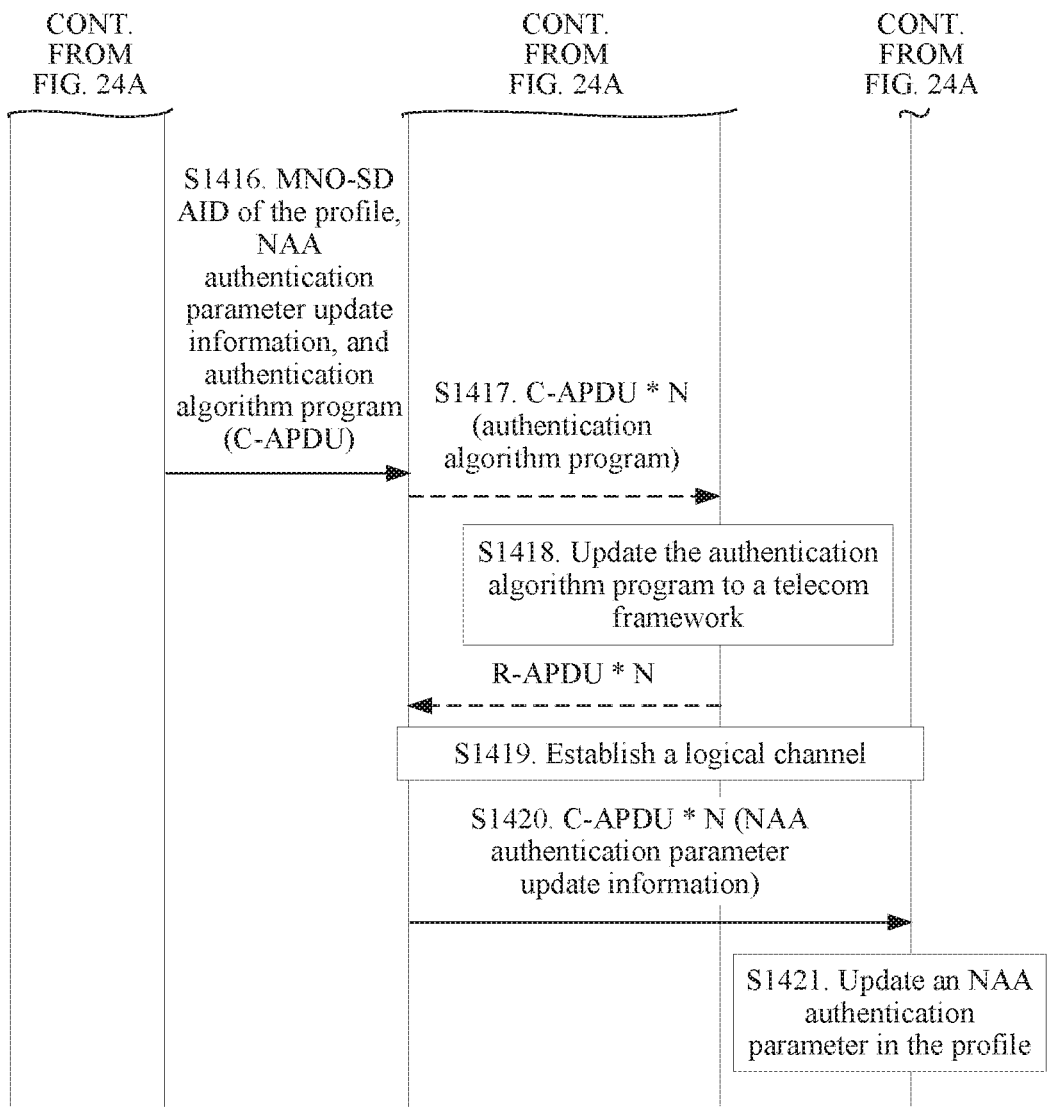
Figure 25:
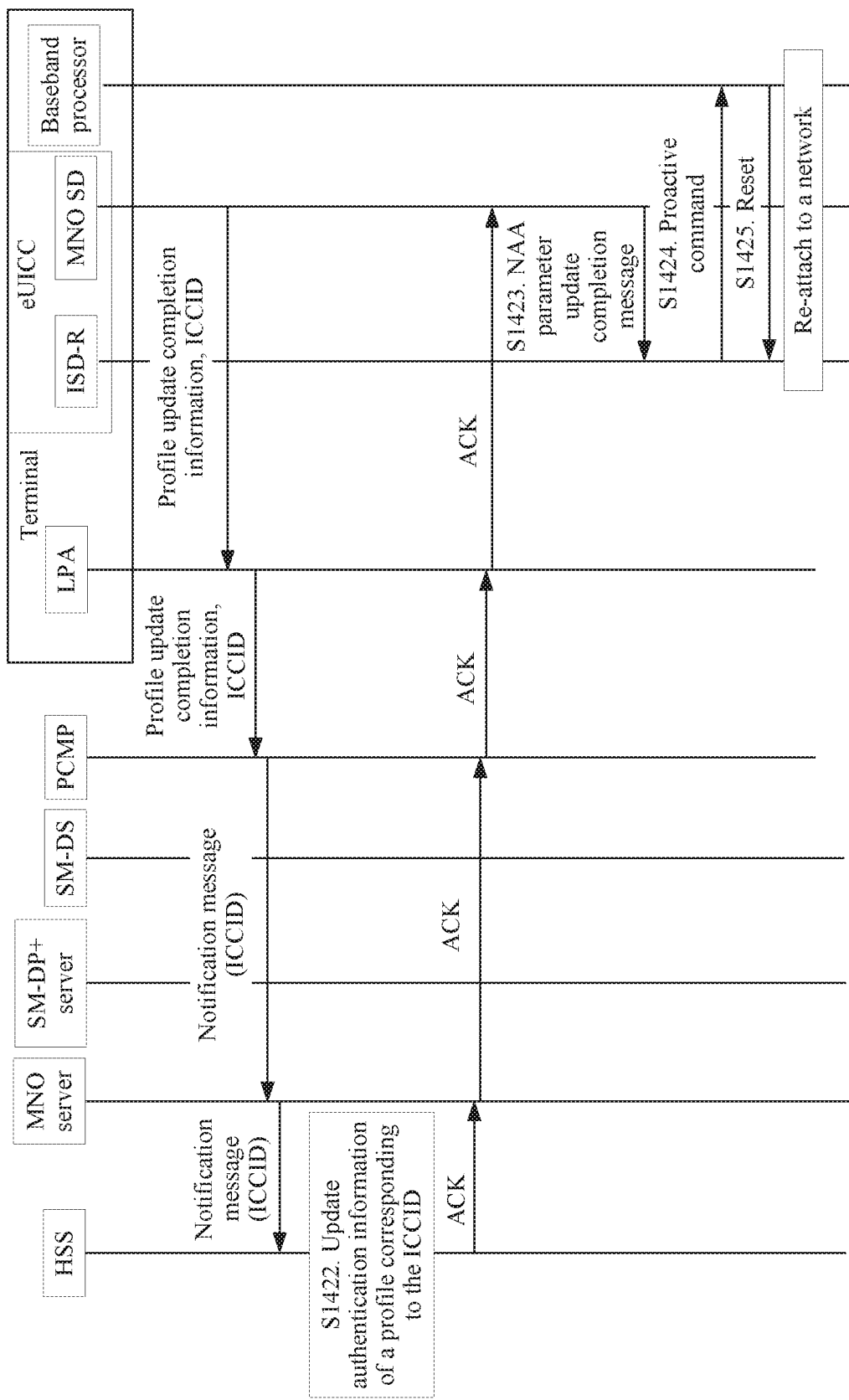
FIG. 25 is a signaling interworking diagram of yet another method for updating network access application authentication information according to an embodiment of the present invention.

FIG. 23 to FIG. 25 are signaling interworking diagrams of yet another method for updating network access application authentication information according to an embodiment of the present invention. As shown in FIG. 23 to FIG. 25, a remote server may include a PCMP, and the PCMP may communicate with an eUICC by using an LPA module on a terminal. The method specifically includes the following steps.

As shown in FIG. 23, an MNO server needs to send NAA authentication parameter update information and an authentication algorithm program to the PCMP, and register an event about an authentication information update with an SM-DS. Specifically, the following steps S1401 to S1406 are included.

S1401. The MNO server determines an NAA authentication information update requirement.

The MNO server may generate authentication algorithm programs of a plurality of versions for different card manufacturer hardware versions, operating system versions, and UICC capabilities, and may further create an authentication algorithm program list. The list includes authentication algorithm program identifiers of different versions, corresponding card manufacturer identifiers, card manufacturer hardware versions, operating system versions. UICC capabilities, and the like. The MNO server may initiate an NAA authentication information update every time a new authentication algorithm program is generated or at a specified time interval.

When NAA authentication information needs to be updated, the MNO server needs to send the NAA authentication update basic information to the PCMP, so that the PCMP sends the NAA authentication update basic information to the terminal after performing processing such as encryption. The NAA authentication update basic information includes the NAA authentication parameter update information, and may further include the authentication algorithm program.

S1402. The MNO server sends the NAA authentication parameter update information to the PCMP, or the MNO server sends the NAA authentication parameter update information and the authentication algorithm program to the PCMP.

S1403. The PCMP generates a first message, where the first message uses an ICCID as an identifier, and the first message includes the NAA authentication parameter update information, or the update package includes the authentication algorithm program and an NAA authentication update parameter.

S1404. The MNO server sends a RegisterNotification (RegisterNotification) message to the SM-DP+ server, where the RegisterNotification message includes an EID and a PCMP address (for example, a PCMP URI).

S1405. The SM-DP+ server sends a RegisterEvent (RegisterEvent) message to the SM-DS, where the RegisterEvent message includes the EID, the PCMP address, and EventID.

S1406. The SM-DS stores an event corresponding to the RegisterEvent message in a first event record.

As shown in FIG. 24A and FIG. 24B, the PCMP needs to send the NAA authentication parameter update information and the authentication algorithm program to the terminal, and complete the update. Specifically, the following steps S1007 to S1021 are included.

S1407. The LPA performs polling on events on the SM-DS, and discovers that the first event record has an event corresponding to the EID of the eUICC installed on the terminal.

S1408. The SM-DS and the eUICC complete bidirectional authentication.

S1409. The SM-DS sends a second event record to the LPA, where the second event record includes the PCMP address and EventID.

S1410. The LPA sends the second event record to the eUICC.

S1411. The eUICC identifies that the event record has the PCMP address.

S1412. The eUICC determines whether the PCMP address in the event is the same as a PCMP address in a profile in an enabled state. If the PCMP address in the event is different from the PCMP address in the profile in the enabled state, the eUICC returns an indication to the LPA and ends the operation.

S1413. If the PCMP URI in the event is the same as a PCMP URI in the profile in the enabled state, the eUICC sends an ICCID and the PCMP URI to the LPA.

S1414. The LPA establishes an HTTPS connection to the PCMP, and the LPA sends the ICCID to the PCMP, to obtain an NAA authentication information update package.

S1415. The PCMP uses the ICCID received from the LPA to match the ICCID carried in the first message.

S1416. After the ICCID received from the LPA successfully matches the ICCID carried in the first message, the PCMP sends the first message to the LPA, where the first message includes an MNO-SD AID.

S1417. If the NAA authentication information update package includes the authentication algorithm program, the LPA first sends the authentication algorithm program to the eUICC.

S1418. The eUICC adds the authentication algorithm program to a telecom framework (telecom framework), and sends an algorithm update completion message to the LPA.

S1419. The LPA and a target MNO-SD establish a logical channel between each other.

S1420. The LPA sends the NAA authentication parameter update information to the MNO-SD by using a C-APDU command.

S1421. The MNO-SD updates an NAA authentication parameter in the profile.

The LPA identifies, by using a tag of an encrypted data part, encrypted data including the authentication algorithm program and encrypted data including the NAA authentication parameter update information, and downloads the encrypted data including the authentication algorithm program and the encrypted data including the NAA authentication parameter update information to the eUICC by using a bound package. By identifying the tag, the LPA may alternatively first send the authentication algorithm program to the eUICC and then send the NAA authentication parameter update information to the eUICC. Optionally, by identifying the tag, the LPA may alternatively first send the NAA authentication parameter update information to the eUICC and then send the authentication algorithm program to the eUICC.

As shown in FIG. 25, when the authentication information in the eUICC is updated, the authentication information further needs to be synchronized between an authentication management server and a baseband processor. Specifically, steps S1422 to S1425 are included.

S1422. The eUICC sends a second message to the HSS by using the LPA, the PCMP, and the MNO server, so that the HSS associates an IMSI with an algorithm corresponding to an authentication algorithm ID based on the second message, where the second message may include the NAA authentication algorithm ID and the ICCID (or a TMSI).

S1423. The HSS sends an acknowledgment message corresponding to the second message to the eUICC by using the MNO server, the PCMP, and the LPA, and after receiving the acknowledgment message, the MNO-SD sends an acknowledgment message to an ISD-R.

S1424. After receiving the acknowledgement message, the ISD-R sends a refresh command to the baseband processor, where the refresh command is used to instruct the baseband processor to access the network based on updated authentication information.

S1425. The baseband processor sends a reset command to the eUICC, and the eUICC re-enables the profile with the authentication information updated. In addition, the baseband processor may further send a terminal response to the eUICC, so that the baseband processor reloads the updated authentication information in the profile, and attaches to the network based on an updated parameter of the profile.

According to this embodiment of this application, the MNO server, the SM-DP+ server, the SM-DS server, and the PCMP may be used to update the authentication information of the profile. The HSS can synchronously update the authentication information of the profile by using the MNO server and the PCMP. By re-enabling the profile, the baseband processor can use the updated authentication information of the profile to access the network.

Figure 26:
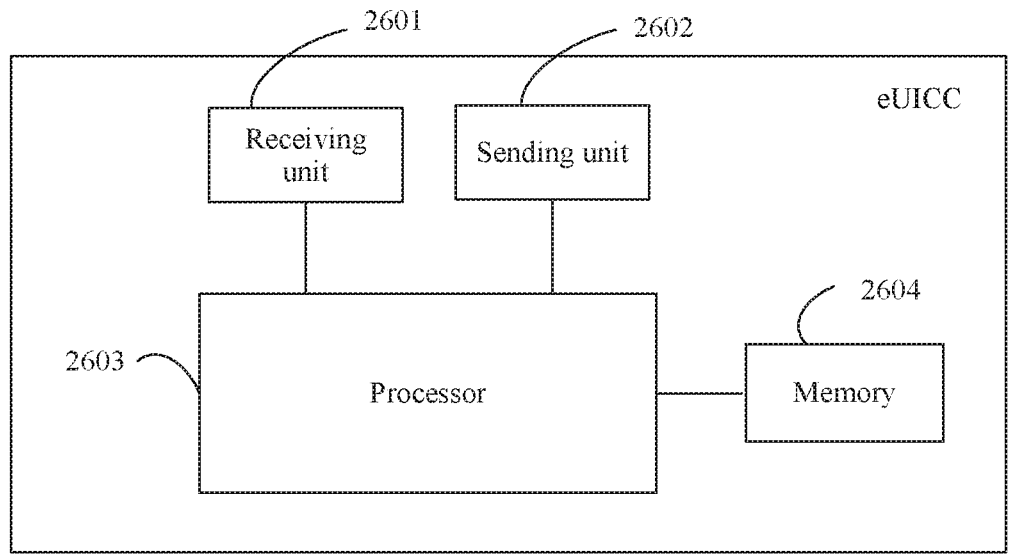
FIG. 26 is a schematic structural diagram of an embedded universal integrated circuit card according to an embodiment of the present invention.

FIG. 26 is a schematic structural diagram of an embedded universal integrated circuit card according to an embodiment of this application. As shown in FIG. 26, the circuit card specifically includes a receiving unit 2601, a sending unit 2602, a processor 2603, and a memory 2604 that can be connected to one another by using a bus (not shown in the figure). The memory 2604 is configured to store a program and data, and the processor 2603 executes the program in the memory 2604 to implement a function of the eUICC.

The memory 2604 may include a read-only memory ROM that is configured to store an operating system and a basic instruction of the eUICC, a random access memory RAM that is configured to store temporary data such as an intermediate computation result, an electrically erasable programmable read-only memory EEPROM that is configured to store various data and programs, where the operating system of the eUICC can read, write, and erase data in the EEPROM, and the like.

The receiving unit 2601 and the sending unit 2602 may be implemented by using serial communications unit I/O, and are configured to communicate with a baseband processor.

The following further describes functions of the modules of the eUICC.

The receiving unit 2601 is configured to receive a first message from a remote server, where the first message includes network access application NAA authentication parameter update information and a first identifier.

The processor 2603 is configured to update authentication information of a profile corresponding to the first identifier based on the NAA authentication parameter update information.

The processor 2603 is further configured to perform bidirectional authentication with a network based on updated authentication information of the profile.

Optionally, the first message further includes profile content update request information, and the profile content update request information is used to instruct the eUICC to update content of the profile corresponding to the first identifier.

Optionally, the first message further includes an authentication algorithm program, and the processor 2603 is further configured to add the authentication algorithm program.

Optionally, the first message further includes profile content and firmware update request information, and the profile content and firmware update request information is used to instruct the eUICC to update eUICC firmware and content of the profile corresponding to the first identifier Optionally, the remote server includes a first remote server and a second remote server. The following is further included:

the sending unit 2602 is configured to send a second message to the first remote server by using the baseband processor, where the second message includes a second identifier, the second message is used to instruct the second remote server to update, in an authentication management server, authentication information of a profile corresponding to the second identifier, and the first identifier and the second identifier correspond to a same profile.

Optionally, the following is further included:

the sending unit 2602 is configured to send a third message to the remote server by using the baseband processor, where the third message includes a third identifier, the third message is used to instruct the remote server to update, in an authentication management server, authentication information of a profile corresponding to the third identifier, and the first identifier and the third identifier correspond to a same profile.

Optionally, the following is further included:

the sending unit 2602 is configured to send a fourth message to the baseband processor when the profile is in an enabled state, where the fourth message is used to instruct the baseband processor to access the network based on the updated authentication information of the profile.

Optionally, the processor 2603 is further configured to re-enable the profile; and the sending unit is further configured to send a fifth message to an LPA, where the fifth message is used to indicate that the profile is successfully re-enabled, so that the LPA instructs the baseband processor to access the network based on the updated authentication information of the profile.

Optionally, the remote server includes a profile content management platform PCMP, where the receiving unit 2601 is further configured to receive, by using the baseband processor, an event record sent by the LPA, where the event record includes a PCMP address, and the event record is used to indicate that the PCMP has information to be sent to the eUICC; and the sending unit 2602 is further configured to: when the PCMP address included in the event record is the same as a PCMP address included in the profile in the enabled state, send an ICCID and the PCMP address to the LPA by using the baseband processor, so that the LPA obtains the information to be sent to the eUICC on the PCMP from the PCMP based on the ICCID, where the information to be sent to the eUICC on the PCMP includes the first message.

Figure 27:
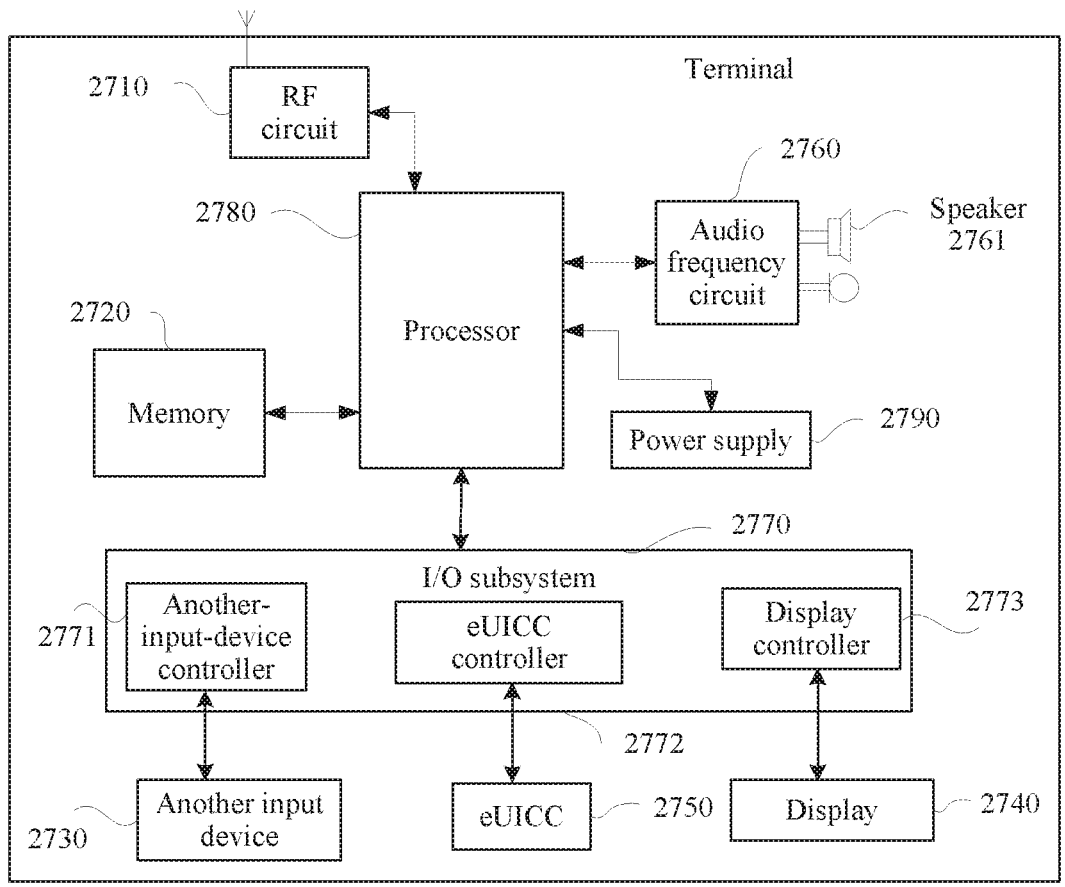
FIG. 27 is a schematic structural diagram of a terminal according to an embodiment of the present invention.

FIG. 27 is a schematic structural diagram of a terminal according to an embodiment of this application. As shown in FIG. 27, in an example in which a mobile terminal is a mobile phone, the mobile phone includes components such as an RF (Radio Frequency, radio frequency) circuit 2710, a memory 2720, another input device 2730, a display 2740, an eUICC 2750, an audio frequency circuit 2760, an I/O subsystem 2770, a processor 2780, and a power supply 2790. A person skilled in the art may understand that a structure of the mobile phone shown in FIG. 27 imposes no limitation on the mobile phone, and may include more or fewer components than those shown in the figure, or combine some components, split some components, or have different component arrangements.

The following describes the components of the mobile phone in detail with reference to FIG. 27.

The RF circuit 2710 may be configured to receive and send a signal in an information receiving and sending process or a call process. Particularly, after receiving downlink information of a remote server (for example, a PCMP, an SM-DP+ server, an SM-DR, or an MNO server), the RF circuit 2710 sends the downlink information to the processor 2780 for processing, and in addition, sends designed uplink data to the remote server. Generally, the RF circuit includes but is not limited to an antenna, at least one amplifier, a transceiver, a coupler, an LNA (Low Noise Amplifier, low noise amplifier), and a duplexer. In addition, the RF circuit 2710 may further communicate with a network and another device through wireless communication. Any communications standard or protocol may be used for the wireless communication, including but not limited to GSM (Global System of Mobile communication, global system for mobile communications), GPRS (General Packet Radio Service, general packet radio service). CDMA (Code Division Multiple Access, code division multiple access), WCDMA (Wideband Code Division Multiple Access, wideband code division multiple access). LTE (Long Term Evolution, long term evolution), email, and SMS (Short Messaging Service, short message service).

The memory 2720 may be configured to store a software program and a module. By running the software program and the module that are stored in the memory 2720, the processor 2780 performs various function applications of the mobile phone and data processing. The memory 2720 may mainly include a program storage area and a data storage area, where the program storage area may store an operating system, an application program required for at least one function, an LPA, and the like, and the data storage area may store data maintained based on use of the mobile phone, and the like. In addition, the storage 2720 may include a high-speed random access memory, or may include a nonvolatile memory, such as at least one magnetic disk storage component, a flash memory component, or another volatile solid-state storage component.

The another input device 2730 may be configured to: receive entered digital or character information, and generate key signal input related to user settings and function control of the mobile phone. Specifically, the another input device 2730 may include but is not limited to one or more of a physical keyboard, a function key (such as a volume control key or an on/off key), a trackball, a mouse, a joystick, or an optical mouse (the optical mouse is a touch-sensitive surface that does not display visual output, or an extension of a touch-sensitive surface formed by a touchscreen). The another input device 2730 is connected to another-input-device controller 1271 in the I/O subsystem 2770, and performs signal exchange with the processor 2780 under the control of the another-input-device controller 2771.

The display 2740 may be configured to display a user interface provided by the LPA, and may further receive user input. Specifically, the display may include a display panel and a touch panel. The display panel may be configured in a form of an LCD (Liquid Crystal Display, liquid crystal display), an OLED (Organic Light-Emitting Diode, organic light-emitting diode), or the like. The touch panel is also referred to as a touchscreen, a touch-sensitive screen, or the like, and may collect a touch or non-touch operation (such as an operation performed by a user on or near the touch panel by using any proper object or accessory such as a finger or a stylus, or a motion sensing operation, where the operation includes an operation type such as a single-point control operation or a multi-point control operation) of the user on or near the touch panel, and drive a corresponding connection apparatus according to a preset program. Optionally, the touch panel may include two parts; a touch detection apparatus and a touch controller. The touch detection apparatus detects a touch location and a touch gesture of the user, detects a signal brought by a touch operation, and sends the signal to the touch controller. The touch controller receives touch information from the touch detection apparatus, converts the touch information into information that can be processed by the processor, and then sends the information to the processor 1280, and can receive and execute a command sent by the processor 1280. In addition, the touch panel may be implemented by using a plurality of types, such as a resistive type, a capacitive type, an infrared ray type, or a surface acoustic wave type, or the touch panel may alternatively be implemented by using any future technology. Further, the touch panel may cover the display panel, and the user may perform, according to content displayed on the display panel (the displayed content includes but is not limited to a soft keyboard, a virtual mouse, a virtual key, and an icon), an operation on or near the touch panel that covers the display panel. After the touch panel detects the operation on or near the touch panel, the touch panel sends the operation to the processor 2780 by using the I/O subsystem 2770 to determine user input. Then, the processor 2780 provides, based on the user input, corresponding visual output on the display panel by using the I/O subsystem 2770. In FIG. 27, the touch panel and the display panel are used as two independent components to implement input and input functions of the mobile phone. However, in some embodiments, the touch panel and the display panel may be integrated to implement the input and output functions of the mobile phone.

The mobile phone may further include an eUICC 1250, and the eUICC may be the eUICC described in the embodiment shown in FIG. 26. The eUICC 1250 may connect to and communicate with the processor 2780 by using an eUICC controller 2772 of the I/O subsystem 2770.

The audio frequency circuit 2760, a loudspeaker 2761, and a microphone 2762 may provide an audio interface between the user and the mobile phone. The audio frequency circuit 2760 may convert received audio data into a signal, and transmit the signal to the loudspeaker 2761, and the loudspeaker 2761 converts the signal into a sound signal for output. In another aspect, the microphone 2762 converts a collected sound signal into a signal, and the audio frequency circuit 2760 converts the signal into audio data after receiving the signal, and then outputs the audio data to the RF circuit 2710, to send the audio data to, for example, another mobile phone, or output the audio data to the memory 2720 for further processing.

The I/O subsystem 2770 is configured to control an external input/output device, and may include the another-input-device controller 2771, the eUICC controller 2772, and a display controller 2773. Optionally, one or more another-input-device controllers 2771 receive a signal from the another input device 2730 and/or send a signal to the another input device 2730. The another input device 2730 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another-input-device controller 2771 may be connected to any one or more of the foregoing devices. The display controller 2773 in the I/O subsystem 2770 receives a signal from the display 2740) and/or sends a signal to the display 2740. After the display 2740 detects user input, the display controller 173 converts the detected user input into interaction with a user interface object displayed on the display 2740, to implement human-computer interaction.

The processor 2780 is a control center of the mobile phone, is connected to parts of the entire mobile phone by using various interfaces and lines, and by running or executing the software program and/or the module that are/is stored in the memory 2720 and by invoking data stored in the memory 2720, performs various functions of the mobile phone and data processing, so as to perform overall monitoring on the mobile phone. Optionally, the processor 2780 may include one or more processing units. Preferably, the processor 2780 may integrate an application processor and a modem processor. The application processor mainly processes an operating system, a user interface, an application program, and the like. The modem processor mainly processes wireless communication. It may be understood that the foregoing modem processor may be not integrated into the processor 2780.

The mobile phone further includes the power supply 2790 (such as a battery) that supplies power to the components. Preferably, the power supply may be logically connected to the processor 2780 by using a power management system, so as to implement functions such as management of charging, discharging, and power consumption by using the power management system.

Although not shown, the mobile phone may further include a camera, a Bluetooth module, a plurality of sensors, and the like, which are not described herein again.

In an embodiment, the memory 2720 stores a local profile assistant LPA program, and the processor 2780 can implement an LPA function by running the LPA program. The LPA may include a receiving unit, configured to receive a first message from the remote server, where the first message includes network access application NAA authentication parameter update information and a first identifier;

a processor, configured to establish a logical channel with a profile corresponding to the first identifier based on the target identifier; and a sending unit, configured to send a second message to the profile corresponding to the first identifier, where the second message includes the NAA authentication parameter update information, so that the eUICC updates authentication information of the profile corresponding to the target identifier based on the NAA authentication parameter update information and performs bidirectional authentication with a network based on updated authentication information.

Optionally, the following is further included:
the receiving unit is further configured to receive a third message sent by the eUICC, where the third message includes profile content update completion information;
the sending unit is further configured to send a fourth message to the remote server, where the fourth message includes the profile content update completion information; and
the sending unit is further configured to send a fifth message to a baseband processor, where the fifth message is used to instruct the baseband processor to obtain the updated authentication information of the profile from the eUICC to access the network.

Optionally, the fourth message includes a second identifier, the fourth message is used to instruct the remote server to update, in an authentication management server, authentication information of a profile corresponding to the second identifier, and the first identifier and the second identifier correspond to a same profile.

Optionally, the first message may further include an authentication algorithm program.

Optionally, the first message further includes profile content and firmware update request information, and the profile content and firmware update request information is used to indicate that the first message is used to update firmware and content of the profile corresponding to the first identifier.

Optionally, the sending unit is further configured to send a sixth message to the eUICC, where the sixth message includes the authentication algorithm program.

Optionally, the receiving unit is further configured to receive first metadata sent by the remote server, where the first metadata includes a profile content update identifier, and the profile content update identifier is used to indicate that the LPA does not need to obtain a user acknowledgment.

Optionally, the receiving unit is further configured to receive a first RegisterEvent message sent by the remote server, where the first RegisterEvent message includes an address of a profile content management platform PCMP:

the sending unit is further configured to send a second RegisterEvent message to the eUICC, where the second RegisterEvent message includes the address of the profile content management platform:

the receiving unit is further configured to receive a first request message sent by the eUICC, where the first request message includes an ICCID and the address of the profile content management platform;

the sending unit is further configured to send a second request message to the profile content management platform based on the first request message, where the second request message includes the ICCID; and the receiving unit is further configured to receive the first message that corresponds to the ICCID and that is sent by the profile content management platform.

Figure 28:
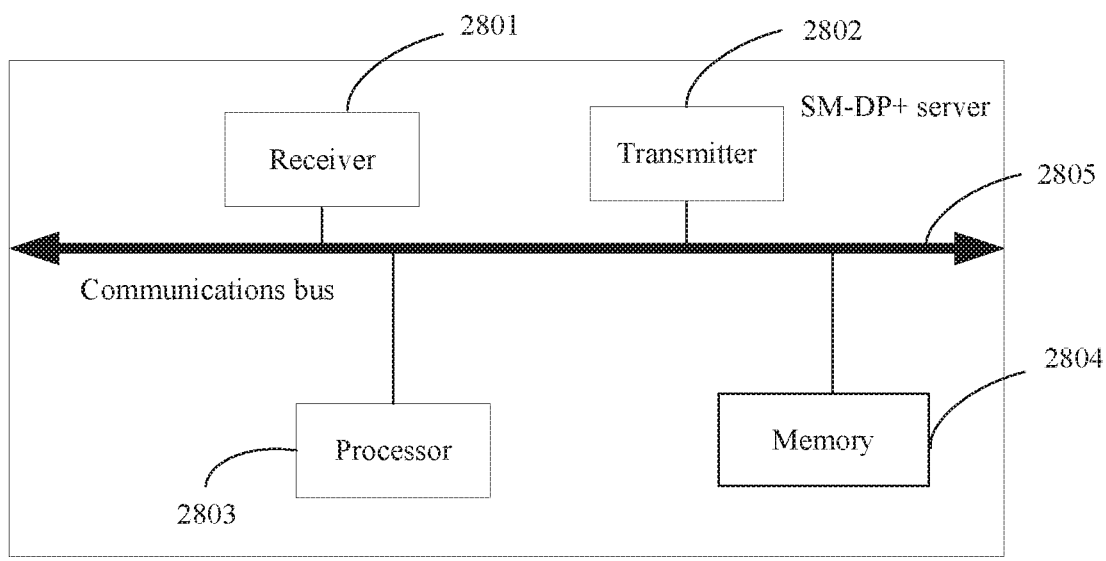
FIG. 28 is a schematic structural diagram of an SM-DP+ server according to an embodiment of the present invention.

FIG. 28 is a schematic structural diagram of an SM-DP+ server according to an embodiment of the present invention. The SM-DP+ server may specifically include a receiver 2801, a transmitter 2802, a processor 2803, and a memory 2804. The modules may be connected by using a bus 1305.

The receiver 2801 and the transmitter 2802 are configured to support data receiving and sending between the SM-DP+ server and the eUICC, the terminal, the MNO server, the PCMP, or the SM-DS in the foregoing embodiments. For example, the receiver 2801 and the transmitter 2802 may be radio frequency circuits and support communication between the SM-DP+ server and the eUICC or the terminal. In a process of communication between a profile download server and the eUICC or the terminal, data and a signaling message are processed by the processor 2803 and sent by the transmitter 2802 to the UICC or the terminal. A signal from the UICC or the terminal is received by the receiver 2801, and is processed by the processor 2803 to obtain data or signaling information that is sent or forwarded by the UICC or the terminal. Alternatively, the receiver 2801 and the transmitter 2802 may be wired communication modules and support communication between the SM-DP+ server and another network entity or server (for example, the MNO server, the PCMP, or the SM-DS). The processor 2803 further executes processing processes related to the SM-DP+ server in FIG. 5 to FIG. 12, FIG. 14 to FIG. 16, FIG. 18, and FIG. 23 and/or another process of a technology described in this application. The memory 2804 is configured to store program code and data of the SM-DP+ server.

Specifically, the transmitter 2802 is configured to send a first message to an LPA, where the first message includes network access application NAA authentication parameter update information and a first identifier.

The receiver 2801 is configured to receive a second message, where the second message includes profile update completion information.

The transmitter 2802 is further configured to send a third message to an operator server based on the second message, where the third message includes the profile update completion information, and the third message is used to instruct the operator server to update, in an authentication management server, authentication information of a profile corresponding to the first identifier.

Optionally, the first message further includes profile content update request information, and the profile content update request information is used to instruct the eUICC to update content of the profile corresponding to the first identifier.

Optionally, the second message includes a second identifier, the second message is used to instruct to update, in the authentication management server, authentication information of a profile corresponding to the second identifier, and the first identifier and the second identifier correspond to a same profile.

Optionally, the first message further includes an authentication algorithm program, so that the LPA sends the authentication algorithm program to the eUICC before sending the NAA authentication parameter update information to the profile corresponding to the first identifier.

Optionally, the first message further includes profile content and firmware update request information, and the profile content and firmware update request information is used to indicate that the first message is used to update firmware and content of the profile corresponding to the first identifier.

It should be understood that in the embodiments of the present invention, the processor may be a central processing unit (Central Processing Unit, CPU for short), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory may include a read-only memory and a random access memory, store program code, and provide an instruction and data to the processor.

The communications bus may further include a power bus, a control bus, a status signal bus, and the like, in addition to a data bus. However, for clear description, various types of buses in the figure are marked as the communications bus.

In an implementation process, steps in the foregoing methods can be implemented by using a hardware integrated logical circuit in the processor, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

An embodiment of this application provides a computer program product including an instruction. When the instruction is run on a computer, the methods or the steps in FIG. 5 to FIG. 18 and FIG. 23 to FIG. 25 are executed.

An embodiment of this application provides a computer-readable storage medium, configured to store an instruction. When the instruction is run on a computer, the methods or the steps in FIG. 5 to FIG. 18 and FIG. 23 to FIG. 25 are executed.

All or some of the foregoing embodiments of the present invention may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for updating network access application (NAA) authentication information implemented by a terminal, comprising:
receiving a first message from a remote server, wherein the first message is received every time a new authentication algorithm is generated by the server, and wherein the first message comprises NAA authentication parameter update information, a first session identifier, and an authentication algorithm program;
updating, in response to the first message, authentication information of a profile corresponding to the first session identifier based on the authentication algorithm program and the NAA authentication parameter update information to obtain updated authentication information;
detaching from a network; and
re-attaching to the network based on the updated authentication information of the profile.

2. The method of claim 1, wherein the terminal comprises an embedded universal integrated circuit card (eUICC), wherein the first message further comprises profile content update request information, and wherein the method further comprises updating, using the eUICC, content of the profile corresponding to the first session identifier based on the profile content update request information.

3. The method of claim 1, wherein the terminal comprises an embedded universal integrated circuit card (eUICC), wherein the first message further comprises profile content and firmware update request information, and wherein the method further comprises updating the eUICC firmware and content of the profile corresponding to the first session identifier based on the profile content and firmware update request information.

4. The method of claim 1, wherein the remote server comprises a first remote server and a second remote server, wherein before detaching from the network, the method further comprises sending a second message to the first remote server, wherein the second message comprises a second session identifier, and wherein the second message instructs the second remote server-to update, in an authentication management server, authentication information of a profile corresponding to the second session identifier.

5. The method of claim 1, wherein before detaching from the network, the method further comprises sending a third message to the remote server, wherein the third message comprises a third identifier, and wherein the third message instructs the remote server to update, in an authentication management server, authentication information of a profile corresponding to the third identifier.

6. The method of claim 1, wherein the terminal comprises an embedded universal integrated circuit card (eUICC), wherein before updating the authentication information of the profile corresponding to the first session identifier, the method further comprises adding the authentication algorithm program to the eUICC.

7. The method of claim 6, further comprising re-attaching to the network based on the NAA authentication parameter update information and the authentication algorithm program.

8. The method of claim 1, wherein before receiving the first message, the method further comprises receiving first metadata from the remote server, wherein the first metadata comprises a profile content update identifier, and wherein the profile content update identifier indicates that the terminal does not need to obtain a user acknowledgment.

9. A terminal, comprising:
a memory configured to store programming instructions; and
one or more processors coupled to the memory, wherein when executed by the one or more processors, the programming instructions cause the terminal to:
receive, every time a new authentication algorithm is generated by a remote server, a first message from the remote server, wherein the first message comprises network access application (NAA) authentication parameter update information, a first-integrated circuit card identifier (ICCID), and an authentication algorithm program;
update, in response to the first message, authentication information of a profile corresponding to the first ICCID based on the authentication algorithm program and the NAA authentication parameter update information;
detach from a network; and
re-attach to the network based on updated authentication information of the profile.

10. The terminal of claim 9, further comprising an embedded universal integrated circuit card (eUICC) coupled to the one or more processors, wherein the first message further comprises profile content update request information, and wherein the eUICC is configured to update content of the profile corresponding to the first ICCID based on the profile content update request information.

11. The terminal of claim 9, further comprising an embedded universal integrated circuit card (eUICC) coupled to the one or more processors, wherein the first message further comprises profile content and firmware update request information, and wherein the eUICC is configured to update eUICC firmware and content of the profile corresponding to the first ICCID based on the profile content and firmware update request information.

12. The terminal of claim 9, wherein the remote server comprises a first remote server and a second remote server, wherein before detaching from the network, the programming instructions further cause the terminal to send a second message to the first remote server, wherein the second message comprises a second ICCID, and wherein the second message instructs the second remote server to update, in an authentication management server, authentication information of a profile corresponding to the second ICCID.

13. The terminal of claim 9, wherein the programming instructions further cause the terminal to send a third message to the remote server, wherein the third message comprises a third identifier, and wherein the third message instructs the remote server to update, in an authentication management server, authentication information of a profile corresponding to the third identifier.

14. The terminal of claim 9, further comprising an embedded universal integrated circuit card (eUICC) coupled to the one or more processors, wherein the programming instructions further cause the terminal to add the authentication algorithm program to the eUICC.

15. The terminal of claim 14, wherein the programming instructions further cause the terminal to re-attach to the network based on the NAA authentication parameter update information and the authentication algorithm program.

16. The terminal of claim 9, wherein the programming instructions further cause the terminal to receive first metadata from the remote server, wherein the first metadata comprises a profile content update identifier, and wherein the profile content update identifier indicates that the terminal does not need to obtain a user acknowledgment.

17. A computer program product comprising computer-executable instructions stored on a non-transitory computer-readable medium, wherein when executed by one or more processors, the computer-executable instructions cause an apparatus to:
- receive, every time a new authentication algorithm is generated by a remote server, a first message from the remote server, wherein the first message comprises network access application (NAA) authentication parameter update information, a first issuer security domain profile (ISD-P) identifier, and an authentication algorithm program;
- update, in response to the first message, authentication information of a profile corresponding to the first ISD-P identifier based on the authentication algorithm program and the NAA authentication parameter update information;
- detach from a network; and
- re-attach to the network based on updated authentication information of the profile.

18. The computer program product of claim 17, wherein the apparatus comprises an embedded universal integrated circuit card (eUICC), wherein the first message further comprises profile content update request information, and wherein the computer-executable instructions further cause the apparatus to update, using the eUICC, content of the profile corresponding to the first ISD-P identifier based on the profile content update request information.

19. The computer program product of claim 17, wherein the apparatus comprises an embedded universal integrated circuit card (eUICC), wherein the first message further comprises profile content and firmware update request information, and wherein the computer-executable instructions further cause the apparatus to update the eUICC firmware and content of the profile corresponding to the first ISD-P identifier based on the profile content and firmware update request information.

20. The computer program product of claim 17, wherein the remote server comprises a first remote server and a second remote server, wherein before detaching from the network, the computer-executable instructions further cause the apparatus to send a second message to the first remote server, wherein the second message comprises a second identifier, and wherein the second message instructs the second remote server to update, in an authentication management server, authentication information of a profile corresponding to the second identifier.

* * * * *